(12) United States Patent
Nakamura et al.

(10) Patent No.: US 10,704,471 B2
(45) Date of Patent: Jul. 7, 2020

(54) HAULAGE VEHICLE

(71) Applicant: HITACHI CONSTRUCTION MACHINERY CO., LTD., Tokyo (JP)

(72) Inventors: Akihiro Nakamura, Tokyo (JP); Naokazu Oda, Tsuchiura (JP); Masatsugu Arai, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 15/775,432

(22) PCT Filed: Sep. 1, 2016

(86) PCT No.: PCT/JP2016/075626
§ 371 (c)(1),
(2) Date: May 11, 2018

(87) PCT Pub. No.: WO2017/081912
PCT Pub. Date: May 18, 2017

(65) Prior Publication Data
US 2018/0347479 A1 Dec. 6, 2018

(30) Foreign Application Priority Data
Nov. 11, 2015 (JP) .................................. 2015-220977

(51) Int. Cl.
*F02D 29/02* (2006.01)
*F02D 41/02* (2006.01)
*B60P 1/04* (2006.01)

(52) U.S. Cl.
CPC ........... *F02D 29/02* (2013.01); *F02D 41/021* (2013.01); *B60P 1/04* (2013.01); *F02D 2200/604* (2013.01); *F02D 2250/26* (2013.01)

(58) Field of Classification Search
CPC ........... F02D 2200/604; F02D 2250/26; F02D 29/02; F02D 41/021; B60W 30/188; B60P 1/04
(Continued)

(56) References Cited

U.S. PATENT DOCUMENTS 6,052,644 A * 4/2000 Murakami ......... B60K 31/0058
123/319
2005/0167164 A1 * 8/2005 Takeda .................... B60G 5/00
177/136
(Continued)

FOREIGN PATENT DOCUMENTS

| JP | 2003-29840 A | 1/2003 |
|---|---|---|
| JP | 2014-15762 A | 1/2014 |
| WO | 2006/043619 A | 4/2006 |

OTHER PUBLICATIONS

Ercelebi, S.G., and A. Bascetin, "Optimization of shovel-truck system for surface mining," Jul. 2009, The Journal of the Southern African Institute of Mining and Metallurgy, vol. 109, pp. 433-439.*
(Continued)

*Primary Examiner* — John M Zaleskas
(74) *Attorney, Agent, or Firm* — Mattingly & Malur, PC

(57) ABSTRACT

Provided is a dump truck that includes an engine (1) and an ECU (7) controlling the engine (1) and that performs a predetermined operation after arriving at a destination. The ECU (7) is configured to makes larger an engine power suppression amount on a route leading the dump truck to the destination as a work waiting time that is a prediction time elapsing from an arrival of the dump truck at the destination to a start of the operation by the dump truck is longer and as an engine load of the dump truck is lower.

2 Claims, 34 Drawing Sheets

(58) Field of Classification Search
USPC .......................................................... 701/50
See application file for complete search history.

(56) References Cited

U.S. PATENT DOCUMENTS

| | | | | |
|---|---|---|---|---|
| 2006/0155447 | A1* | 7/2006 | Uken | B60W 10/06 701/50 |
| 2007/0219680 | A1* | 9/2007 | Kumar | B61L 3/006 701/19 |
| 2007/0219681 | A1* | 9/2007 | Kumar | B61L 3/006 701/19 |
| 2007/0219683 | A1* | 9/2007 | Daum | B61L 3/006 701/19 |
| 2007/0225878 | A1* | 9/2007 | Kumar | B61L 3/006 701/19 |
| 2007/0233364 | A1* | 10/2007 | Kumar | B61L 3/006 701/123 |
| 2008/0082223 | A1* | 4/2008 | Daum | B61L 3/006 701/19 |
| 2008/0092849 | A1 | 4/2008 | Mizuguchi | |
| 2008/0125924 | A1* | 5/2008 | Daum | B61L 3/006 701/19 |
| 2008/0167766 | A1* | 7/2008 | Thiyagarajan | B61L 3/006 701/19 |
| 2008/0167767 | A1* | 7/2008 | Brooks | B61L 3/006 701/20 |
| 2008/0183490 | A1* | 7/2008 | Martin | B61L 3/006 705/1.1 |
| 2008/0195269 | A1* | 8/2008 | Lacy | B61L 3/006 701/24 |
| 2008/0201019 | A1* | 8/2008 | Kumar | B61L 3/006 700/286 |
| 2008/0208393 | A1* | 8/2008 | Schricker | G08G 1/20 701/1 |
| 2008/0319618 | A1* | 12/2008 | Sjogren | F02D 29/02 701/50 |
| 2009/0177335 | A1* | 7/2009 | Young | G05B 13/024 701/1 |
| 2009/0327011 | A1* | 12/2009 | Petroff | G06Q 10/02 705/5 |
| 2010/0131122 | A1* | 5/2010 | Dersjo | B60W 30/18 701/2 |
| 2010/0198466 | A1* | 8/2010 | Eklund | E02F 9/26 701/50 |
| 2010/0332061 | A1* | 12/2010 | Forslow | B60L 50/61 701/22 |
| 2013/0041561 | A1* | 2/2013 | Asami | E02F 9/2246 701/50 |
| 2014/0148973 | A1* | 5/2014 | Young | G05B 13/024 701/1 |
| 2014/0257669 | A1* | 9/2014 | Wu | B60W 10/06 701/102 |
| 2015/0032373 | A1* | 1/2015 | Ikari | E01C 23/01 701/517 |
| 2015/0210283 | A1* | 7/2015 | Young | G05B 13/024 701/93 |
| 2015/0285174 | A1* | 10/2015 | Scott | F02D 41/0245 60/274 |
| 2016/0069675 | A1* | 3/2016 | Bando | G01C 21/16 701/519 |
| 2016/0121873 | A1* | 5/2016 | Fushiki | B60K 6/46 701/22 |
| 2017/0001639 | A1* | 1/2017 | Dempsey | B60W 30/146 |
| 2017/0017239 | A1* | 1/2017 | Kanai | G05D 1/02 |
| 2017/0088138 | A1* | 3/2017 | Goli | B60W 10/06 |

OTHER PUBLICATIONS

International Search Report of PCT/JP2016/075626 dated Nov. 8, 2016.
International Preliminary Report on Patentability received in corresponding International Application No. PCT/JP2016/075626 dated May 24, 2018.

* cited by examiner

HAULAGE VEHICLE

TECHNICAL FIELD

The present invention relates to a haulage vehicle including a dump truck and, in particular, to engine control for a haulage vehicle.

BACKGROUND ART

In a mine, in order to carry a load such as ore and stripping from a loading place to an earth dumping site, a large number of dump trucks (mine trucks) of a loading amount of 100 tons or more are operating. The route from the loading place to the earth dumping site is fixed, and the dump trucks repeatedly go back and forth through the same route. A plurality of dump trucks (e.g., dump trucks of the same rating) are traveling in a single route, with the operation time being 24 hours. In the case of a plurality of dump trucks which are thus large and operating for a long time, a transportation efficiency which is indicated by a work amount (energy amount) per unit cost (initial cost+running cost) is regarded as important. In recent years, in aiming at an improvement in terms of this value, attention is being paid to a reduction in running cost. In this connection, there has been proposed a method of reducing consumption amount of fuel used in an engine.

The pamphlet of Internal Publication No. 2006/043619 (Patent Document 1) discloses a system which, in order to achieve a reduction in fuel consumption amount in a work vehicle (dump truck), the power that the engine can output is restricted in accordance with the load of the work vehicle. According to this document, the driver first selects, as the engine output mode, a power mode or a standard mode by a mode setting switch. In accordance with the selected output mode, the engine characteristics are determined. As compared with the power mode, in the standard mode, the engine use region is restricted, and the operation is performed with a lower output power. Further, after the selection of the output mode, the height of the load state of the work vehicle is determined from the weight of the loaded substance (loading amount) and the suspension pressure. When it is determined that the load is high, the engine use region is expanded to the high output power side, and when it is determined that the load is low, there is performed a process to narrow the engine use region to the low output power side. Thus, in the case where it is determined that the load is low, the engine output power is suppressed, whereby a surplus power is limited, and the fuel consumption amount is reduced.

PRIOR ART DOCUMENT

Patent Document

Patent Document 1: Pamphlet of International Publication No. 2006/043619

SUMMARY OF THE INVENTION

Problem to be Solved by the Invention

In the technique of the above document, however, the engine output power is varied solely in accordance with the load of the work vehicle, so that the following problem can be involved. For example, when it is determined that the load is low in either of the output modes and the engine output power is suppressed, the fuel consumption amount is reduced, whereas the traveling speed can also be reduced. A reduction in the traveling speed leads to a reduction in the work amount of the work vehicle, so that there is the possibility of the transportation efficiency not being improved or rather deteriorated. That is, in the technique of the above document, a reduction in the fuel consumption amount and an improvement in terms of transportation efficiency are not always compatible with each other.

After the examination of the above problem in the prior art, the present invention has been made with a view toward solving the above problem. Accordingly, it is an object of the present invention to provide a haulage vehicle in which it is possible for an improvement in terms of transportation efficiency and a reduction in fuel consumption amount to be compatible with each other. The above-mentioned and other objects and novel features of the present invention will become apparent from the description of the present specification and the appended drawings.

Means for Solving the Problem

A brief description of a typical example of the invention disclosed in the present application will be as follows.

That is, there is provided a haulage vehicle that includes an engine and a controller controlling the engine and that performs a predetermined operation after arriving at a destination. the controller is configured to makes larger an engine power suppression amount on a route leading the haulage vehicle to the destination as a work waiting time that is a prediction time elapsing from an arrival of the haulage vehicle at the destination to a start of the operation by the haulage vehicle is longer and as an engine load of the haulage vehicle is lower.

Effect of the Invention

The effect attained by the typical example of the invention disclosed in the present application can be briefly summarized as follows: By taking into consideration a work waiting time and an engine load, it is possible to provide a haulage vehicle in which an improvement in terms of transportation efficiency and a reduction in fuel consumption amount are compatible with each other.

MODES FOR CARRYING OUT THE INVENTION

Figure 1:
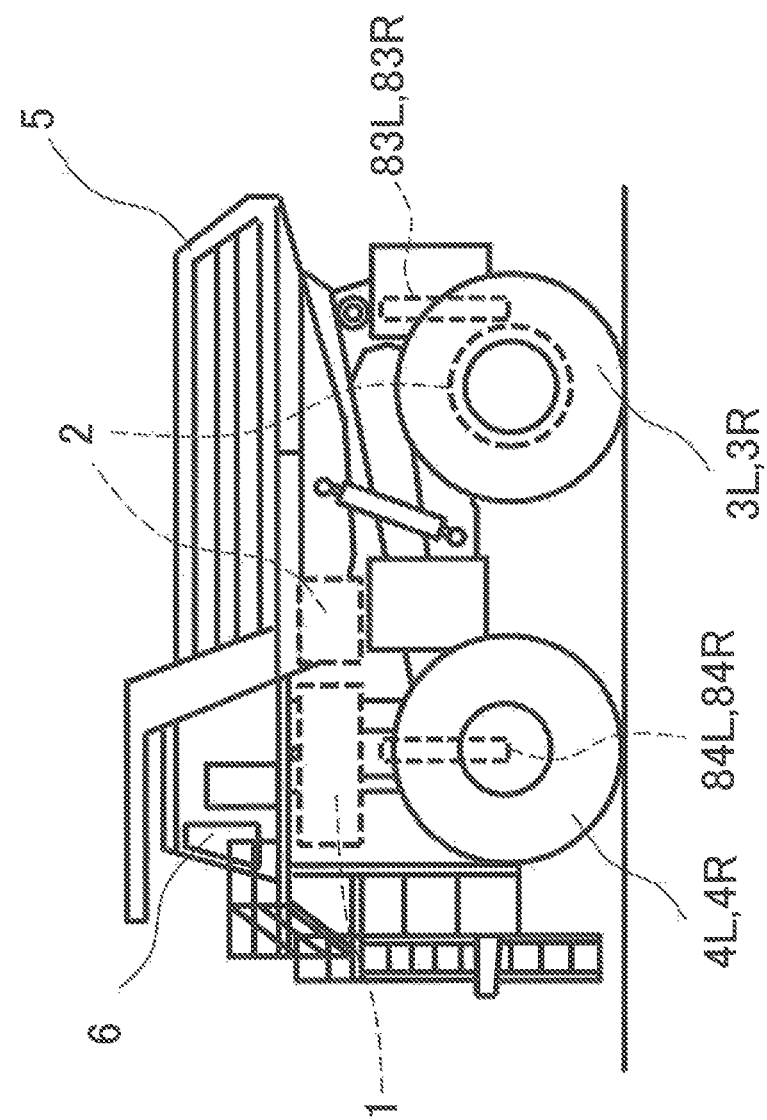
FIG. 1 is a side view of a mine dump truck in which an engine controller according to the present invention is mounted.

A typical embodiment of the invention disclosed in the present application will be described in detail. The reference numerals in the drawings referred to solely indicate by way of example what is included by the concept of the components to which they are added.

In the following embodiments, an engine controller and a mine dump truck equipped therewith will be described in which taking into consideration the engine load (loading amount) and the work waiting time at which the vehicle stops work, the maximum output power of the engine is suppressed, whereby it is possible to achieve compatibility between an improvement in terms of transportation efficiency and a reduction in fuel consumption amount.

The term "loading amount" is the total weight of the load carried by the dump truck. It fluctuates as appropriate in accordance with loading/unloading. The "work waiting time" is the standby time elapsing until the work (loading operation/earth disposal operation) to be conducted after the arrival of the dump truck at the destination is started. It corresponds to the time elapsing after the arrival at the destination until the work is started. The work waiting time does not include the time for traveling to the destination. The "destination" is a concept including not only a certain point but also a certain region (plane). The "arrival at the destination" is a concept including both that the dump truck (haulage vehicle) has arrived at a certain point, and that the dump truck has entered a certain region. The "work waiting time" can vary in accordance with the nature of the work, the place, the subject, etc., so that there is no need to uniquely determine it. That is, it is not always necessary to strictly measure the work waiting time using the time at which the dump truck arrives at the destination as the reference. It may be a period of time that starts at an arbitrary beginning where the generation of a waiting time can be recognized since the arrival at the destination until a point in time before the start of the work. Similarly, the time at which the work waiting time is terminated is determined as appropriate somewhere between the termination of the work and the start of the traveling to the destination.

Before the description of embodiment 1, to be described will be the mechanism that helps to establish compatibility between an improvement in terms of transportation efficiency and a reduction in fuel consumption amount by taking into account the work waiting time.

The destination for a dump truck of a mine is mainly a loading place and an earth dumping site (unloading place), between which the dump truck alternately goes back and forth. The dump truck performs the loading operation at the loading place, and, after the completion of the loading operation, travels toward the earth dumping site, where it performs the earth disposal operation (unloading operation). After the completion of the earth disposal operation, it returns to the loading place again, thus repeating the work cycle. For example, it may be assumed that the work waiting time at the earth dumping site is the period of time for which an own vehicle is at standby until the earth disposal of the preceding vehicle is completed in the case where the own vehicle has arrived at the earth dumping site in spite of the fact that the preceding vehicle is performing earth disposal at the earth dumping site. The reason for the generation of the work waiting is that the speed of the own vehicle is higher than that of the preceding vehicle and that the completion of the operation by the preceding vehicle is delayed than is supposed. Whatever the reason, it does not affect the execution of the invention.

While the work waiting time is being generated, however early the own vehicle may reach the destination, the requisite time for one work cycle cannot be shortened due to the work waiting time. In this situation, if the own vehicle reaches the destination while the preceding vehicle is within the work waiting time, no problem is involved by delaying the arrival time at the destination by reducing the traveling speed. Moreover, a reduction in traveling speed leads to a reduction in fuel consumption amount. Further, in the case of arrival within the work waiting time, there is no change in the work cycle time, so that the transportation efficiency is improved through the reduction in fuel consumption amount. In the present embodiment, at the time of generation of the work waiting time, the engine power is suppressed while taking the engine load into consideration, whereby a reduction in traveling sped on the way to the destination is promoted to delay the arrival time at the destination within the range of the work waiting time. As a result, it is possible to achieve compatibility between a reduction in fuel consumption amount and an improvement in terms of transportation efficiency. Hereinafter, an example of the haulage vehicle realizing such an operation/effect will be described.

Embodiment 1

The construction of a mine dump truck adopted in the description of the present embodiment will be described with reference to the side view of FIG. 1. The mine dump truck of the present embodiment is equipped with an engine 1 mounted in the front portion of the vehicle body, a loading platform (vessel) 5 mounted in the upper rear portion of the vehicle body and vertically rotatable around the rear portion of the vehicle body, and a driver's seat 6 installed in the upper front portion of the vehicle body. Further, a pair of left and right driven wheels 4L and 4R are arranged at the lower front side of vehicle body, and a pair of left and right driving wheels 3L and 3R are arranged at the lower rear side of the vehicle body. Around the driven wheels 4L and 4R and the driving wheels 3L and 3R, there are respectively mounted suspensions 84L, 84R, 83L, and 83R. The pressures of the suspensions 84L, 84R, 83L, and 83R are detected by a sensor (loading amount sensor) 93 (See FIG. 2), thereby making it possible to detect the loading amount.

Next, a power transmission device 2 transmitting the power of the engine 1 to the driving wheels 3L and 3R will be described. Preferable examples of the power transmission device 2 include a combination of a field winding type generator, an inverter, and a traveling induction motor (traveling motor). Hereinafter, such a construction will be referred to as the electric type construction. In the electric type power transmission device 2, the rotational energy of the engine 1 is converted to electric energy by the generator, and is supplied to the inverter and the traveling motor. Then, the traveling motor drives the driving wheels 3L and 3R, whereby traveling of the dump truck becomes possible.

Next, the connection relationship of the above components and the controller will be described with reference to FIG. 2. The dump truck shown in FIG. 1 is further equipped with an ECU (Engine Control Unit) 7, a PCU (Power Control Unit) 8, a traveling data gaining device 9, and a display device 10. The devices 7 through 10 consist of computers. First, the connection between the components will be described. The engine 1 is connected to the power transmission device 2 by a mechanical mechanism. Further, the power transmission device 2 is connected to the driving wheels 3L and 3R by a mechanical mechanism.

Next, the connection relationship between the controller and the components will be described. First, the ECU 7 inputs an accelerator opening (Acl) obtained from the traveling data gaining device 9 (The accelerator opening is 100% when the amount by which the accelerator is stepped on is maximum), a loading amount (PLD), and traveling speed data (Vel). The traveling data gaining device 9 in the present embodiment is a device capable of gaining data from various sensors installed in the vehicle (an accelerator opening sensor 91, a vehicle traveling speed sensor 92, a loading amount sensor 93, a GPS sensor 94 for gaining vehicle position, a vehicle body angle sensor 95, a hydraulic pump pressure sensor 96, etc.) via an in-vehicle CAN (Controller Area Network). The data on the accelerator opening, traveling speed, loading amount, vehicle position, vehicle body angle, and pump pressure referred to as appropriate in the following description is gained based on the detection values of the various sensors 91 through 96. While in FIG. 2 the various sensors 91 through 96 are only shown one each, there can be included sensors existing in plural numbers. Further, so long as it is possible to gain data on the accelerator opening, traveling speed, loading amount, vehicle position, vehicle body angle, and pump pressure can be gained, sensors other than the sensors 91 through 96 may be mounted, gaining data from those sensors.

Based on the input value, the ECU 7 computes an engine speed command (Ne*) and an engine output power command (Pow*). As a result, Ne* is input to a governor of the engine 1, and Ne* and Pow* are input to the PCU 8 that is the controller of the power transmission device 2. Pow* is input to the display device 10 that can display to the driver whether or not the traveling speed is to be reduced.

Figure 17:
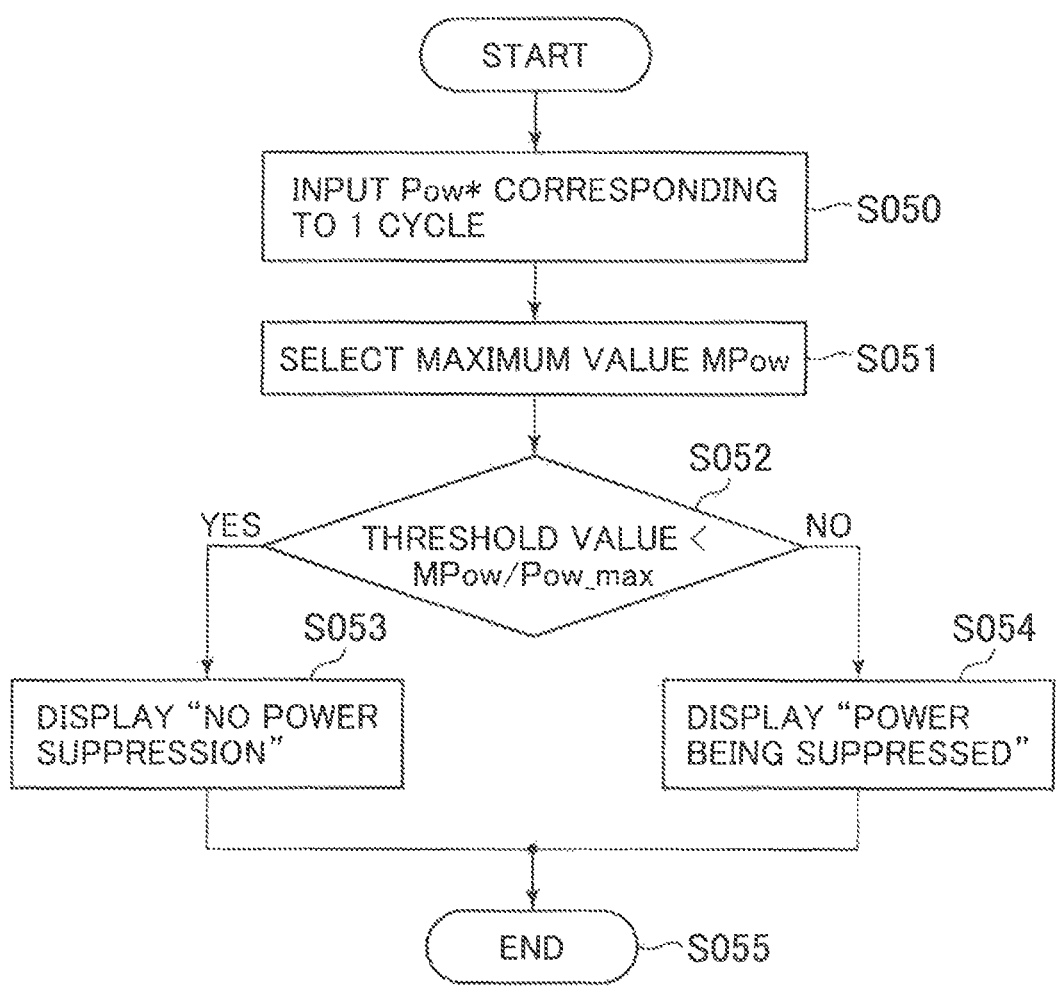
FIG. 17 is a diagram illustrating processing by a display device 10.

Here, the display device 10 will be described. FIG. 17 shows the processing by the controller (computer) related to the display processing of the display device 10. While the controller is mounted in the display device 10, some other controller inside/outside the vehicle may be endowed with the function.

First, when an engine output power command (Pow*) corresponding to one work cycle (from loading completion to earth disposal start in the case of the loaded state (earth disposal operation) is input to the display device 10, and from earth disposal completion to loading start in the case of the empty state (loading operation)) is input to the display device 10 (S050), the maximum value in one cycle MPow is selected from among them (S051). The maximum value MPow is divided by the maximum engine power (Pow_max) that can be supplied to the driving wheels 3L and 3R, and it is determined whether or not the resultant value is larger than a threshold value (S052). In the case where it is smaller than the threshold value, there is displayed a message to the effect that the maximum output is being suppressed (e.g., "power being suppressed") is displayed (S054). In the case where it is larger than the threshold value, there is displayed a message to the effect that the engine output power is normal (e.g., "no power suppression") (S053).

Due to this display, if the traveling speed is reduced by the same amount by which the accelerator is stepped on, the driver can continue traveling while recognizing that the reduction in traveling speed is due to the power suppression control (control to increase the engine power suppression amount) by the controller (ECU 7) and not due to vehicle abnormality. Further, from this display, the driver can implicitly read the presence/absence of the work waiting time, so that it is to be advantageously expected that wasteful acceleration by the driver can be suppressed. Further, while in the example of FIG. 17 the display is effected in two stages, it is also possible to set a plurality of threshold values in step S052 stepwise to subdivide the display.

Next, the PCU 8 that is the controller of the power transmission device 2 will be described. The PCU 8 inputs the voltage measurement value at the connection point between the generator and the inverter, the wheel speed, the engine output power command value, and the measurement value and the command value of the engine speed, whereby it outputs the excitation current command of the field winding type generator and the torque command of the traveling motor to the power transmission device 2 to control the power transmission device 2.

Figure 3:
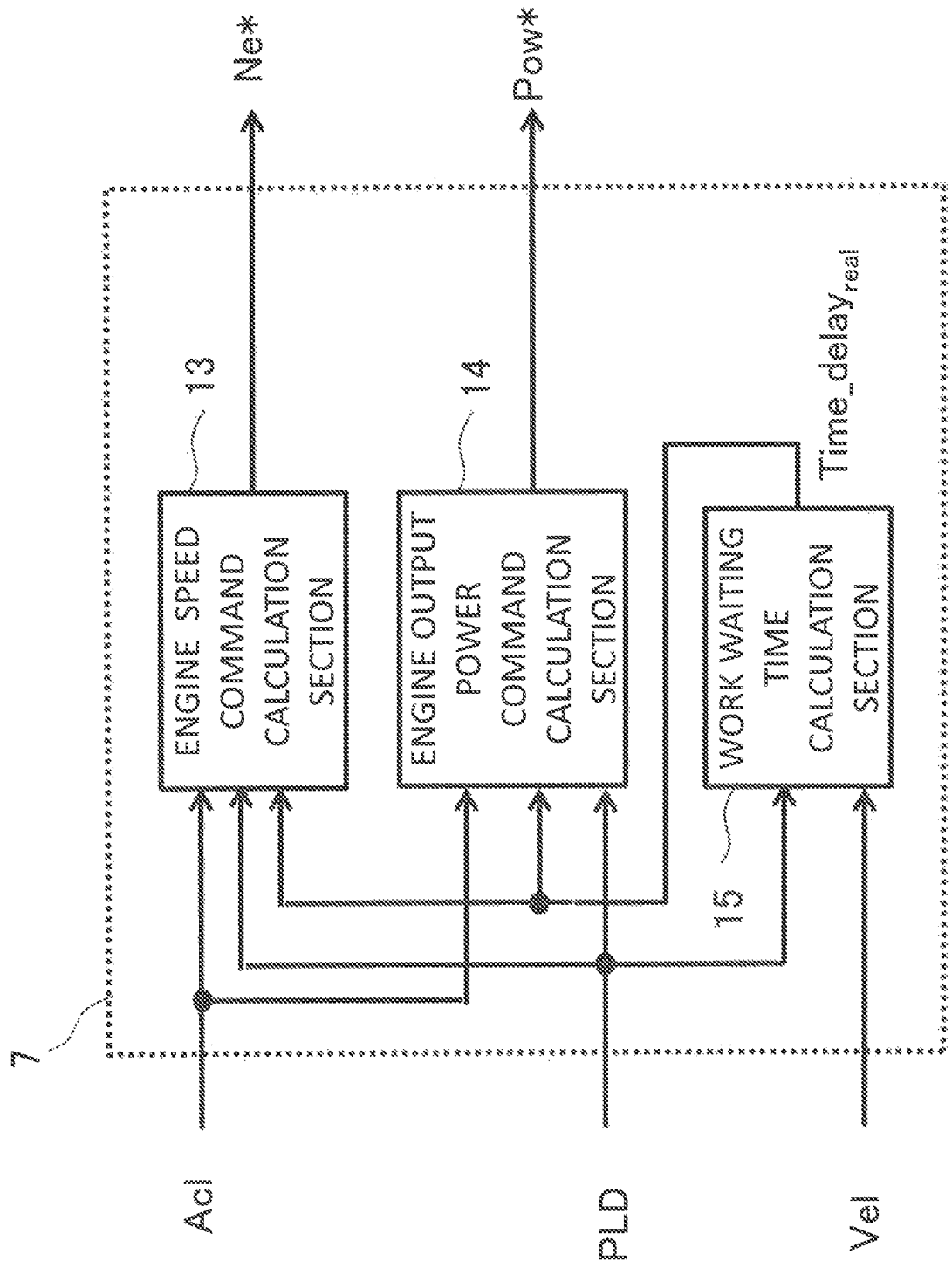
FIG. 3 is a control block diagram illustrating processing by an ECU 7 according to embodiments 1 and 3 of the present invention.

The engine controller (ECU) 7 will be described with reference to FIG. 3. The ECU 7 is a block determining the command value (Ne*, Pow*) of the engine speed and the engine output power. The function block constituting the ECU 7 will be described. Roughly speaking, the function block is to be divided into an engine speed command calculation section 13, an engine output power command calculation section 14, and a work waiting time calculation section 15. The engine speed command calculation section 13 inputs an accelerator opening signal (Acl), a loading amount (PLD), and an average (during traveling) work waiting time (Time_delay$_{real}$), and calculates an engine speed command (Ne*). Similarly, the engine output power command calculation section 14 inputs the accelerator opening signal (Acl), the loading amount (PLD), and the average (during traveling) work waiting time (Time_delay$_{real}$), and calculates the engine output power command (Pow*). Finally, the work waiting time calculation section 15 inputs the loading amount (PLD) and the traveling speed data (Vel), and calculates the average (during traveling) work waiting time (Time_delay$_{real}$). Here, the engine speed command calculation section 13, the engine output power command calculation section 14, and the work waiting time calculation section 15 will be described in detail.

Figure 4:
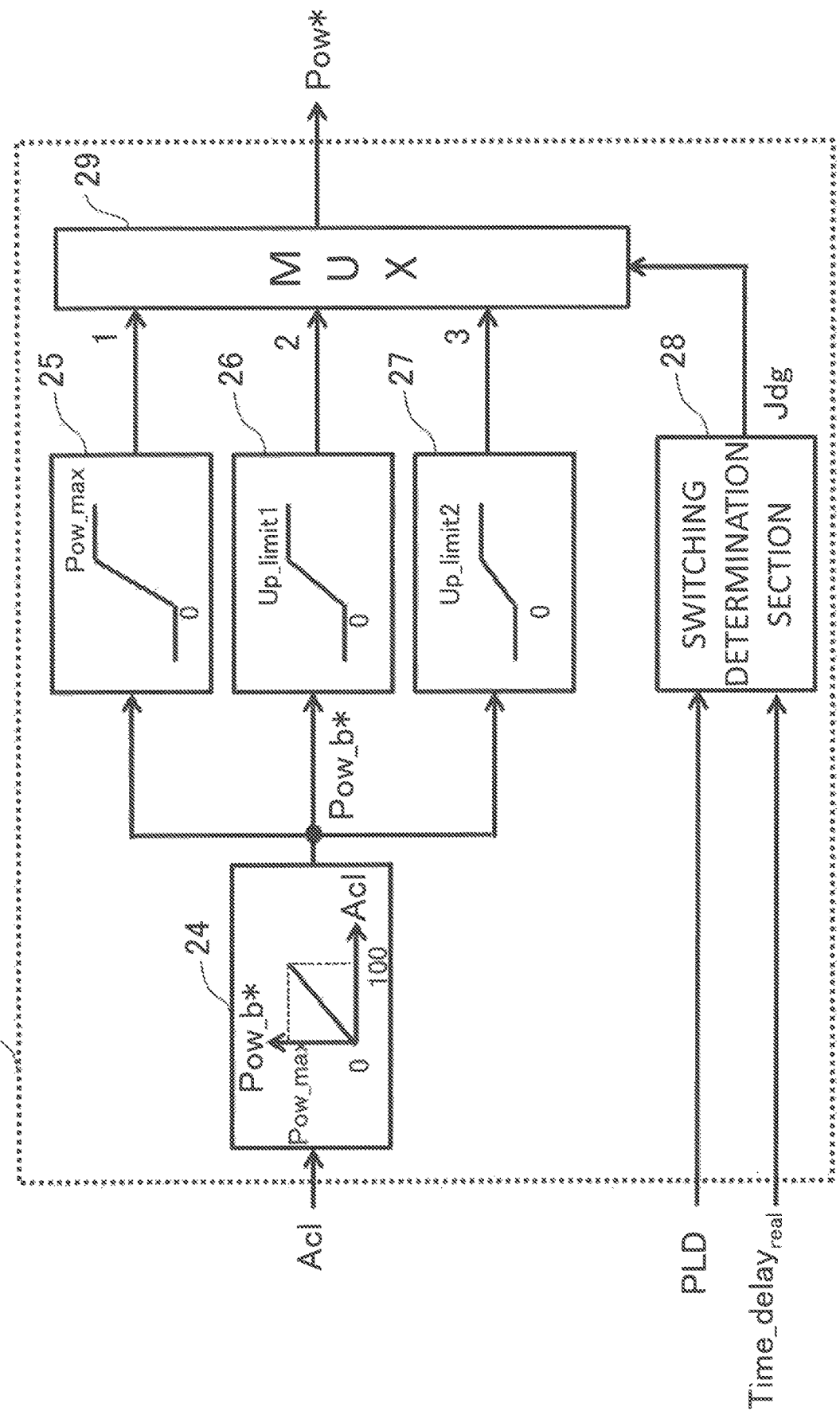
FIG. 4 is a control block diagram illustrating processing by an engine output power command calculation section 14 according to embodiments 1 and 3 of the present invention.

First, referring to FIG. 4, the engine output power command calculation section 14 will be described in detail. The engine output power command calculation section 14 is a block determining the engine output power command (Pow*). A map 24 determines a function that outputs an engine output power command value (Pow_b*) in accordance with the graph in the drawing when the accelerator opening signal (Acl) (In the following, a "map" is something which indicates a function which, when a certain value is input, outputs another certain value in accordance with a predetermined rule). First, the accelerator opening signal (Acl) input to the engine output power command calculation section 14) is input to the map 24, and a temporary engine output power command value (Pow_b*) is determined from the accelerator opening signal (Acl). This command value (Pow_b*) serves as the engine output power command value in the case where power suppression is not effected. The map 24 is formed such that when the accelerator opening is 100%, the engine output power command is maximum (Pow_max), and that when the accelerator opening is 0%, the engine output power command is 0 (zero). Thereafter, Pow_b* is input to each of limiters 25, 26, and 27.

The limiter 25 is selected in the case where there is no work waiting time, and the limiters 26 and 27 are selected in the case where there is a work waiting time. Further, the limiter 26 is selected at the time of loaded traveling, and the limiter 27 is selected at the time of empty traveling. The lower limit value of the limiters 25, 26, and 27 is 0 (zero). The upper limit value of the limiter 25 is set as Pow_max, the upper limit value of the limiter 26 is set as Up_limit1, and the upper limit value of the limiter 27 is set as Up_limit2. As shown in FIG. 4, the magnitude relationship of the three values has a strong tendency to be Up_limit2<Up_limit1<Pow_max. Depending upon the condition, however, other magnitude relationship can hold true.

Figure 5:
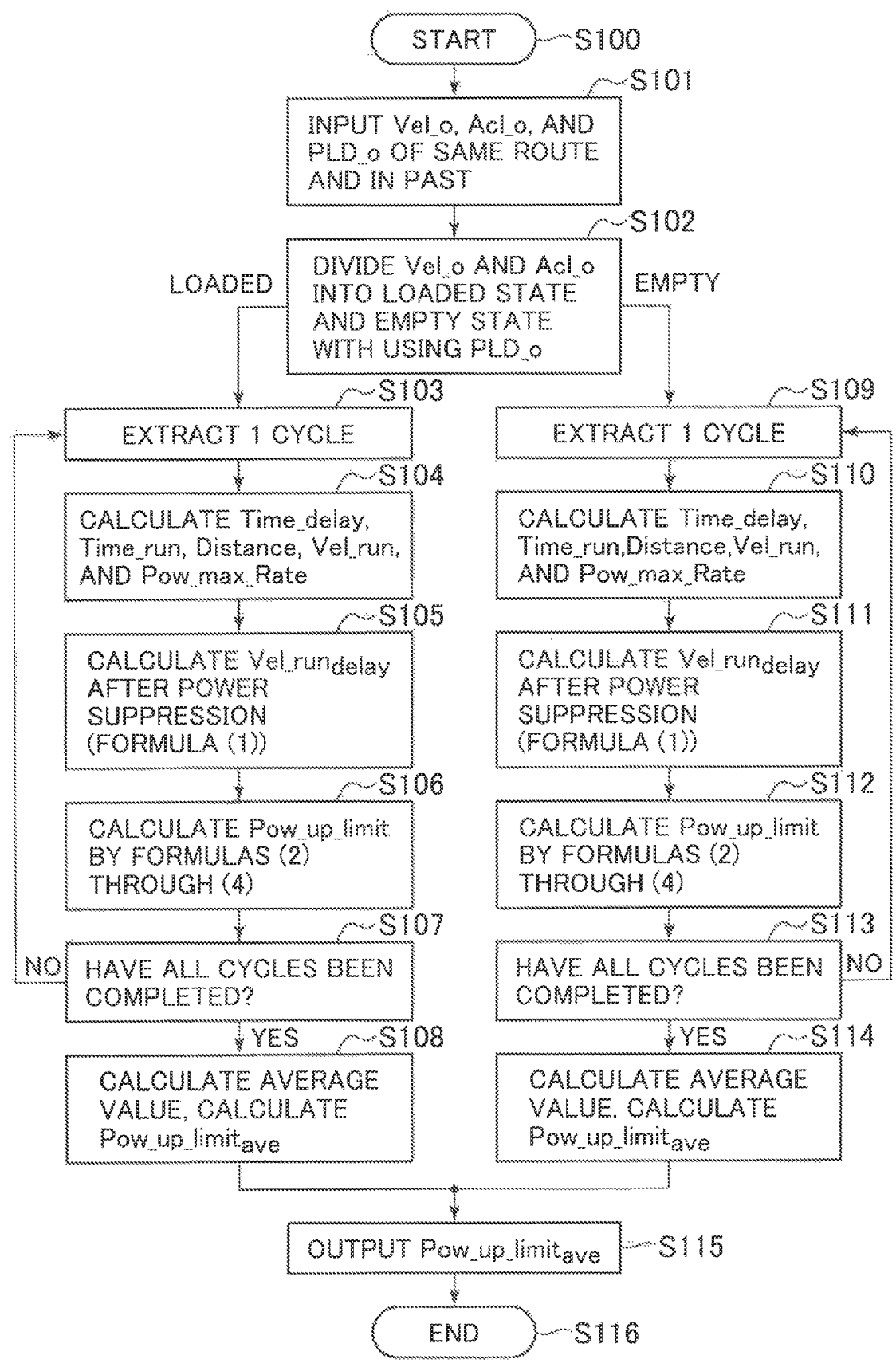
FIG. 5 is a flowchart for calculating an average engine output power upper limit value (Pow_up_limit$_{ave}$) before traveling in embodiments 1 and 3 of the present invention.

Here, the method of determining the upper limit values Up_limit1 and Up_limit2 will be described. In the present embodiment, it is necessary for the upper limit values (Up_limit1 and Up_limit2) to be calculated before the traveling and set in the vehicle. Further, in the case where the traveling route is changed, the previous calculation must be performed again using data on the new route. FIG. 5 is a flowchart illustrating the previous calculation. First, in the present embodiment, there is prepared time series data on the traveling speed data (Vel_o), accelerator opening (Acl_o), and loading amount (PLD_o) when the running is performed through the same route with no power suppression control performed in the past (S101). After this, using information on the loading amount (PLD_o) and a threshold value (threshold value Mth) described below, Vel_o and Acl_o are divided into data on the loaded state and data on the empty state (S102). In the circumstances, the loaded state in a mine dump truck is substantially a fully loaded state, so that, as the threshold value for dividing Vel_o and Acl_o into data on the loaded state and data on the empty state, there can be used, for example, a value corresponding to a full loading amount.

Next, processing related to load data (S103 through S108) will be described. After the division of the data, the data is further divided cycle by cycle (in the case of the loaded state, from the completion of the loading to the start of the earth disposal, and, in the case of the empty state, from the completion of the earth disposal to the start of the loading). As a result, Vel_o and Acl_o are turned into time series data for each cycle (S103). Then, based on the data obtained through division in step S103, the work waiting time (Time_delay), the traveling time (Time_run), the traveling distance (Distance), the average traveling speed (Vel_run), and the maximum power output frequency (Pow_max_rate) are calculated for each cycle (S104). Next, the definition of each item of data will be described.

First, the work waiting time (Time_delay) in the loaded state may be regarded as follows: suppose, for example, despite the fact that the preceding vehicle is performing the earth disposal operation at the earth dumping site, the own vehicle has arrived at the earth dumping site. In this case, the work waiting time can be regarded as the period of time for which the own vehicle is at standby. At this time, the calculation of the work waiting time can be defined as the obtaining of the difference between the time when the loaded traveling is completed (loaded traveling completion time) and the time when the earth disposal is started (earth disposal start time). The loaded traveling completion time can be detected, for example, as the time when the speed becomes zero after a condition in which the loading amount is not less than a predetermined threshold value (e.g., not less than half the full loading amount and not more than the threshold value Mth described below) and in which the traveling speed is higher than zero has continued for a fixed period of time. The earth disposal start time can be detected, for example, as the time at which the loading amount has become less than the threshold value. Although it is necessary to add a control input, the earth disposal start time may be detected as the time when the pressure of the hydraulic pump supplying the hydraulic fluid to the hydraulic cylinder (hoist cylinder) for turning the loading platform 5 upwards has exceeded the threshold value. It can also be detected from the time when the detection pressure of an additionally installed sensor for detecting the pressure of the hoist cylinder has exceeded a threshold value. Further, it can also be detected from the time when the detected inclination angle of the loading platform with respect to the vehicle body has exceeded a threshold value.

On the other hand, the work waiting time (Time_delay) in the empty state may be regarded, for example, as the period of time for which the own vehicle, which has arrived at the loading place although the preceding vehicle is performing the loading operation thereat, is at standby until the loading operation of the preceding vehicle is completed. At this time, the calculation of the work waiting time can be defined as the difference between the empty traveling completion time and the loading start time. The empty traveling completion time can be detected, for example, as the time when the speed has become zero after the continuation for a fixed period of time of a condition in which the loading amount is less than the threshold value and in which the traveling speed is more than zero. The loading start time can be detected, for example, as the time when the loading amount, which has been zero, has become not less than the threshold value.

Figure 6:
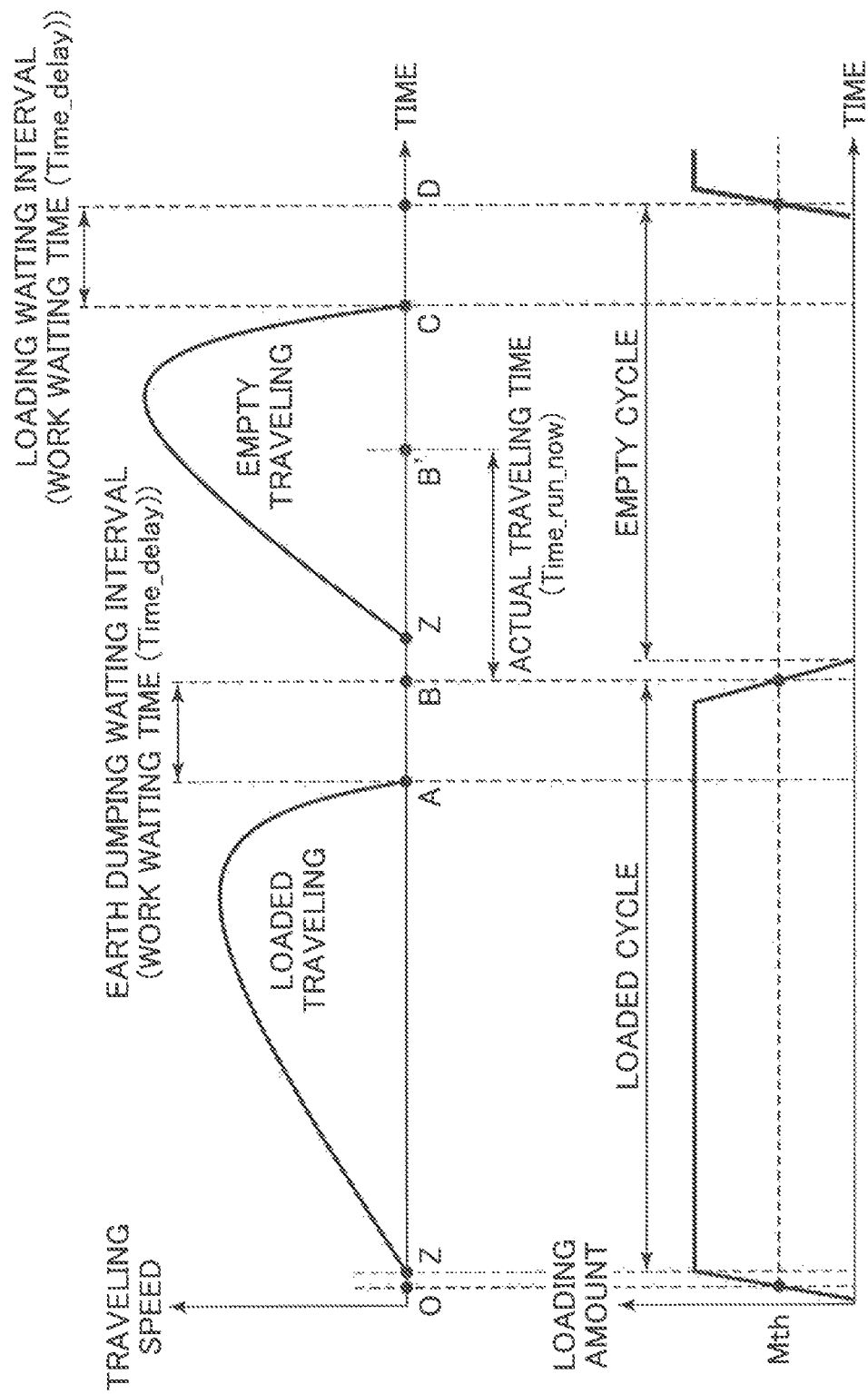
FIG. 6 is a diagram illustrating a definition of a work waiting time (Time_delay) and a cycle.
Figure 7:
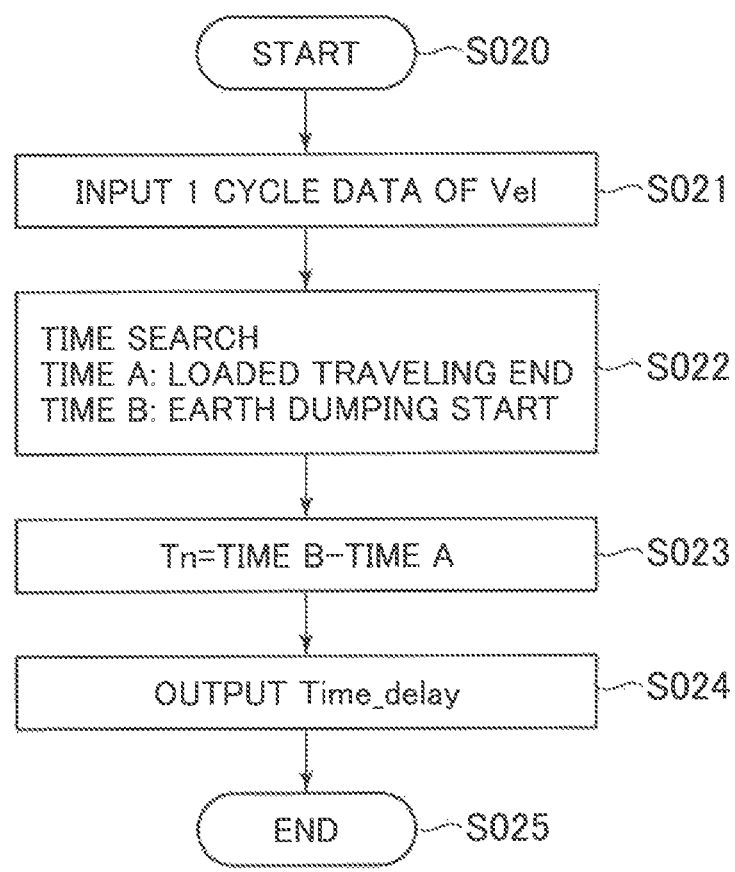
FIG. 7 is a flowchart for calculating a work waiting time (Time_delay) of the present invention before traveling.

FIG. 6 is a diagram illustrating each work waiting time (earth disposal waiting time and loading waiting time) in the form of time series data. The previous calculation of the work waiting time (Time_delay) is executed in accordance with the flowchart of FIG. 7. First, traveling speed data (Vel) corresponding to one cycle at the time of loading is input (S021). Next, to calculate the earth disposal waiting time, the loaded traveling completion time A and the earth disposal start time B (In the case where the object of calculation is the loading waiting time, A and B are respectively replaced by the empty traveling completion time C and the loading start time D) are extracted from the traveling speed data (S022). After this, by obtaining the difference between the times A and B (S023), it is possible to calculate the work waiting time (Time_delay (given as Tn in the drawings)) with respect to one item of cycle data, and this is output (S024).

Figure 8:
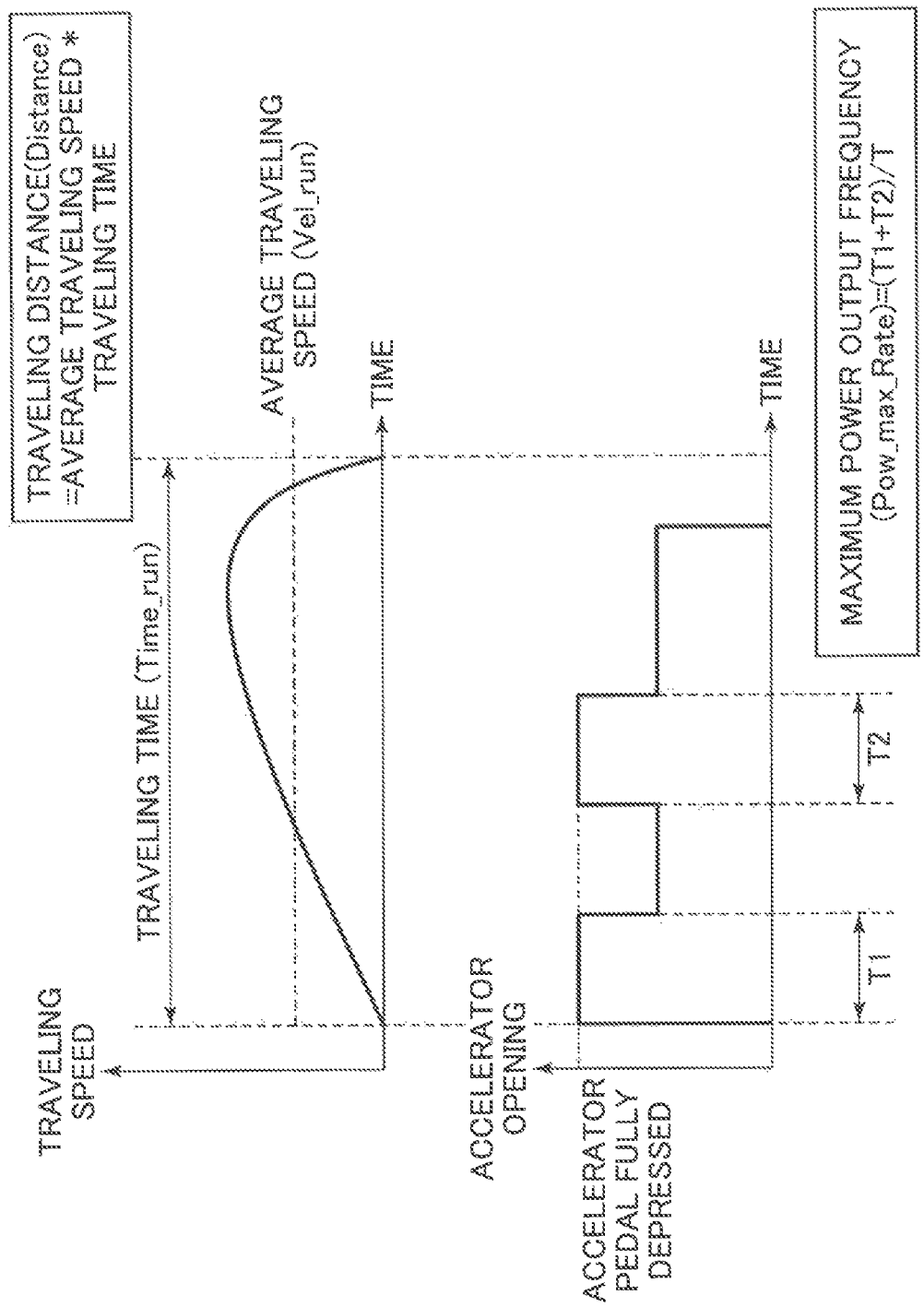
FIG. 8 is a diagram illustrating a definition of a traveling time (Time_run), an average traveling speed (Vel_run), a maximum power output frequency (Pow_max_Rate), and a traveling distance (Distance).

Next, FIG. 8 shows the definition of the traveling distance (Distance), the average traveling speed (Vel_run), and the maximum power output frequency (Pow_max_Rate). The average traveling speed (Vel_run) is the average value of the 1-cycle traveling speed. In the loaded traveling, the traveling time (Time_run) is the period of time for which there has continued a condition in which the loading amount is not less than a predetermined threshold value and in which the traveling speed is more than zero). In the empty traveling, it is a period of time for which there has continued a condition in which the loading amount is less than the predetermined threshold value and in which the traveling speed is more than zero. The traveling distance (Distance) is the product of the average traveling speed (Vel_run) and the traveling time (Time_run). The maximum power output frequency (Pow_max_Rate) is a value indicating the ratio of the time in which the engine maximum power has been output in one cycle time. The time concerned is calculated starting from the period of time when the accelerator opening has become full. The definition of the maximum power may be the engine maximum output power value. Alternatively, it may be a value obtained by subtracting a fixed amount from the maximum output power of the engine.

After the completion of the calculation of the value of step S104 of FIG. 5, the average traveling speed after power suppression (Vel_run$_{delay}$) is calculated by using the following formula (1) (S105). Since the traveling time is lengthened by an amount corresponding to the work waiting time (Time_delay), the average traveling speed after power suppression is lowered as compared with the average traveling speed before power suppression.

[Formula 1]

$$\text{Vel\_run}_{delay} = \frac{\text{Distance}}{\text{Time\_run} + \text{Time\_delay}} \quad (1)$$

Next, by using the following formulas (2) through (4), the engine output power after the power suppression is determined (S106).

[Formula 2]

$$P\_comp\_b = \frac{\text{Vel\_run}_{delay}}{\text{Vel\_run}} \left( = \frac{\frac{\text{Power\_run}_{delay}}{\text{Trq\_run}}}{\frac{\text{Power\_run}}{\text{Trq\_run}}} \right) \quad (2)$$

[Formula 3]

$$P\_comp = P\_comp\_b \times (1 - \text{Pow\_max\_rate}) \times \text{Grade} \quad (3)$$

[Formula 4]

$$\text{Pow\_up\_limit} = (P\_comp) * (\text{Pow\_max}) \quad (4)$$

First, in formula (2), the ratio of the average speed before and after the engine output power suppression to thereby determine the previous value (P_comp_b) of the engine output power suppression amount. In this calculation, there is calculated the degree to which the power is to be suppressed on the average. Further, this time, to simplify the calculation, the speed ratio can be treated as the power ratio. The relationship between the power and the traveling speed (the wheel rotational speed) is "the output power varies as the traveling speed×the driving wheel torque). Further, the components of the tire torque are acceleration resistance and traveling resistance (rolling resistance component, gradient resistance component, and air resistance component). From the above, when the traveling speed changes, the acceleration resistance changes. However, it is to be expected that the change in the traveling speed due to the power suppression is approximately ten and several % at the most, so that, in the present embodiment, the calculation is performed on the assumption that the driving wheel torque is the same before and after the power suppression.

Next, in equation (3), the previous value (P_comp_b) of the engine output power suppression amount is multiplied by the maximum power output frequency (Pow_max_Rate) and the gradient value correction value (Grade). Here, when the gradient value [%] of the road surface measured is positive (upward slope), the gradient value correction value is a value not less than 1, and when it is negative (downward slope), the gradient value correction value is a value less than 1. Calculation is performed such that the larger the gradient value, the larger the value (the gradient value correction value=gradient value [%]×α. α is a constant). As the gradient value [%] when calculating the gradient correction value, it is possible to use the average value of the gradient value in one cycle or the average value of the gradient value [%] of the timing with which the maximum power is output. In the latter method, the road surface gradient that is a factor of the engine load is taken into consideration, making it possible to calculate the degree to which the engine output power is to be reduced at the time of the maximum output. The reason for this performing this calculation is that, in a mine, the driver mainly employs 0% (output power zero) and 100% (output power maximum) as the accelerator opening. In such a situation, it is desirable not to suppress power over the entire traveling time but to concentrate power suppression at the time of the output of maximum power from the viewpoint of a reduction in fuel consumption amount.

In the case where the gradient is large, the reduction in traveling speed is great, and it is necessary to correct the power suppression amount based on the gradient value, so that the calculation of equation (3) is performed. In the case where there is no measurement value of the gradient value [%], the calculation may be performed with the gradient correction value being constantly 1. In this case, the engine load taken into consideration in the calculation of the engine output power upper limit value (engine power suppression amount) is solely the loading amount, and the gradient value is not taken into consideration.

Finally, the maximum power (Pow_max) that can be supplied to the driving wheels 3L and 3R is multiplied by P_comp in equation (4), whereby it is possible to calculate the engine output power upper limit value (Pow_up_limit). All cycles of the above calculation have been completed (S107), the average value of all the cycles is calculated (S108), and this is output as the average engine output power upper limit value (Pow_up_limit$_{ave}$) (S115). While the calculation method for the loaded state has been described up to now, the calculation method is the same in the case of the empty state, and a description of the processing of steps S109 through S114 of FIG. 5 will be left out. When the route is the same, the maximum power output frequency (Pow_max_Rate) as calculated in the empty state is smaller than that in the loaded state, so that the power suppression amount (P_comp) tends to be larger as compared with that in the loaded state.

Here, in the case where the average engine output power upper limit value (Pow_up_limit$_{ave}$) is applied to the limiters 26 and 27, the calculation result of the loaded state is substituted for Up_limit1 (limiter 26). The calculation result of the empty state is substituted for Up_limit2 (limiter 27).

Figure 9:
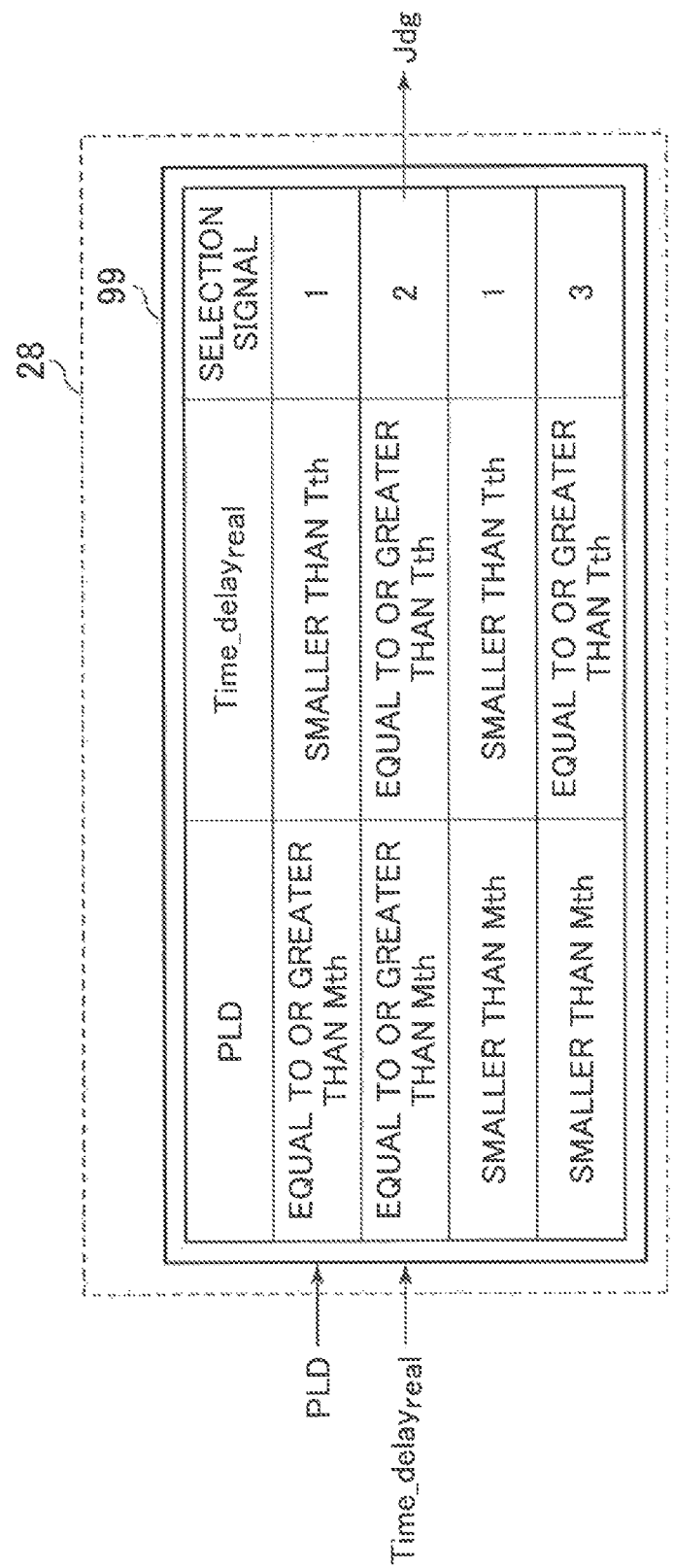
FIG. 9 is a diagram illustrating processing by a switching determination section 28 of embodiments 1, 3, 5, and 7 of the present invention.

Next, a method of selecting these three limiters 25, 26, and 27 will be described. In FIG. 4, an MUX 29 selects the limiter 25, 26, and 27 based on the output (selection signal (Jdg)) of the switching determination section 28. The switching determination section 28 inputs the loading amount (PLD) and the average (during traveling) work waiting time (Time_delay$_{real}$), and outputs the selection signal (Jdg) by using a map (control switching condition map) 99 shown in FIG. 9. In the map 99, the values of the loading amount (PLD) and the average (during traveling) work waiting time (Time_delay$_{real}$) are compared with a previously set threshold value to determine the selection signal (Jdg). In FIG. 9, the numbers of the "selection signal" correspond to the numbers added to the three arrows direction toward the MUX 29 from the limiters 25, 26, and 27 in FIG. 4, and the MUX 29 selectively inputs the output from the limiter 25, 26, or 27 from which the arrows of the same number as that of the "selection signal" extends. The threshold value (Mth) of the loading amount (PLD) in FIG. 9 can be set to a value less than the maximum loading amount, and the threshold value (Tth) of the work waiting time (Time_delay$_{real}$) can be set to a value approximately half the average value of the work waiting time (Time_delay). The above-mentioned two kinds of threshold values may each exist in plural numbers. In the case where a plurality of threshold values are set, it is necessary to increase the number of limiters that can be selected by the MUX 29 when there is a work waiting time (two in the example of FIG. 4) in accordance with the number of threshold values.

Figure 10:
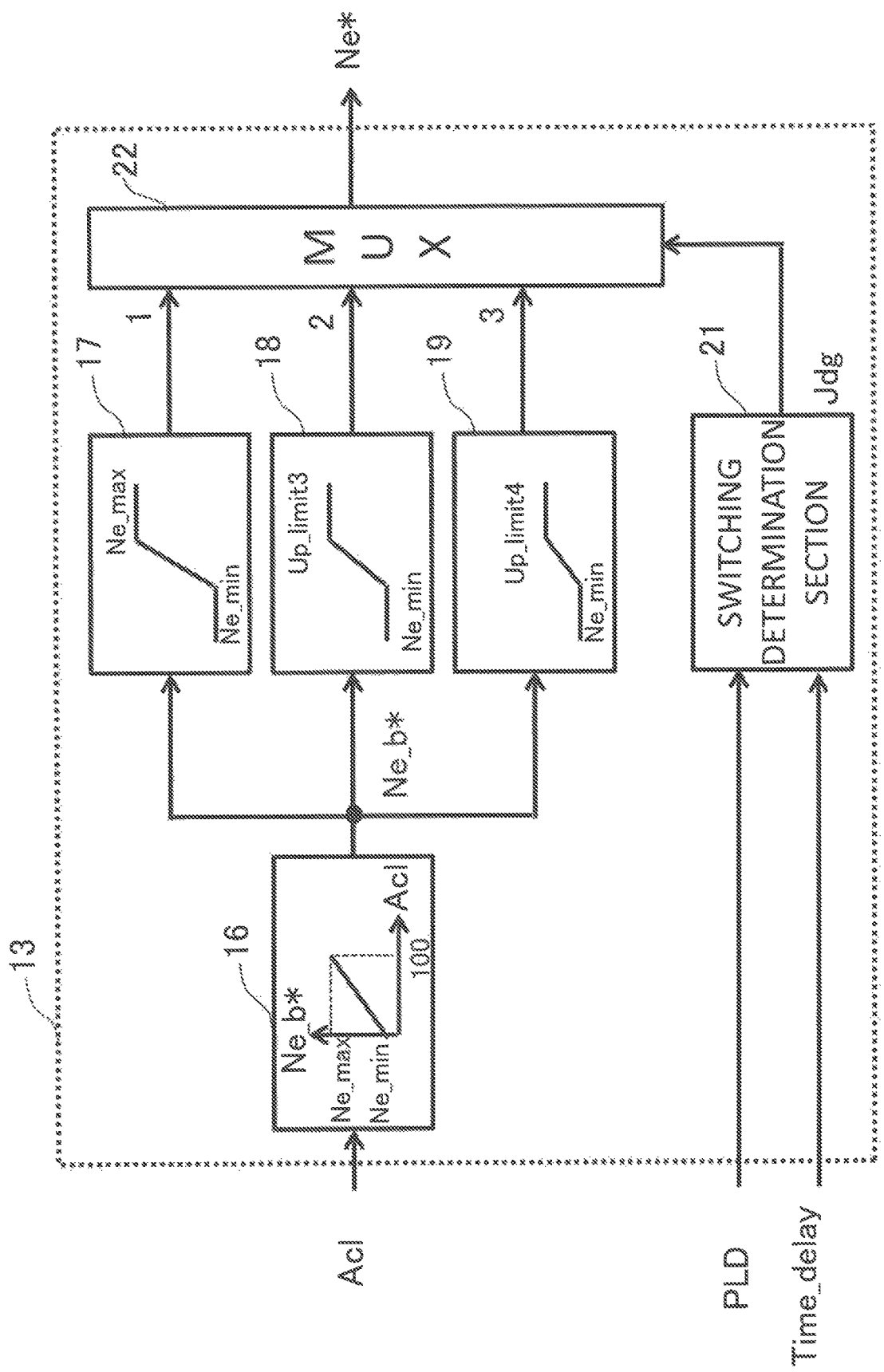
FIG. 10 is a control block diagram illustrating processing by an engine speed command calculation section 13 of embodiments 1 and 3 of the present invention.

Next, the engine speed command calculation section 13 will be described in detail with reference to FIG. 10. The engine speed command calculation section 13 is a block determining the engine speed command (Ne*). The accelerator opening signal (Acl) input to the engine speed command calculation section 13 is first input to the map 16.

The map 16 determines the function of the accelerator opening signal (Acl). When the accelerator opening signal (Acl) is input, a temporary engine speed command value (Ne_b*) is output. The engine speed command value (Ne_b*) can be the engine speed command value in the case where no power suppression is effected. The map 16 is formed such that when the accelerator opening is 100%, the maximum engine speed (Ne_max) determined by the engine is output and that when the accelerator opening is 0%, an idling speed (Ne_min) is output. The Ne_b* output from the map 16 is input to each of the limiters 17, 18, and 19.

The limiter 17 is selected in the case where there is no work waiting time, the limiter 18 is selected in the case where a work waiting time is generated during loaded traveling, and the limiter 19 is selected when a work waiting time is generated during empty traveling. The selection of the limiters 17, 18, and 19 is effected by the MUX 22 and the switching determination section 21. The switching determination section 21 functions in the same manner as the switching determination section 28 of FIG. 4, and outputs a selection signal (Jdg) based on the map 99 of FIG. 9. Each of the lower limit values of the limiters 17, 18 and 19 is an idling speed (Ne_min). The upper limit value of the limiter 17 is set as Ne_max, the upper limit value of the limiter 18 is set as Up_limit3, and the upper limit value of the limiter 19 is set as Up_limit4. In the present embodiment, the upper limit values must be calculated before traveling, and set in the vehicle.

Figure 11:
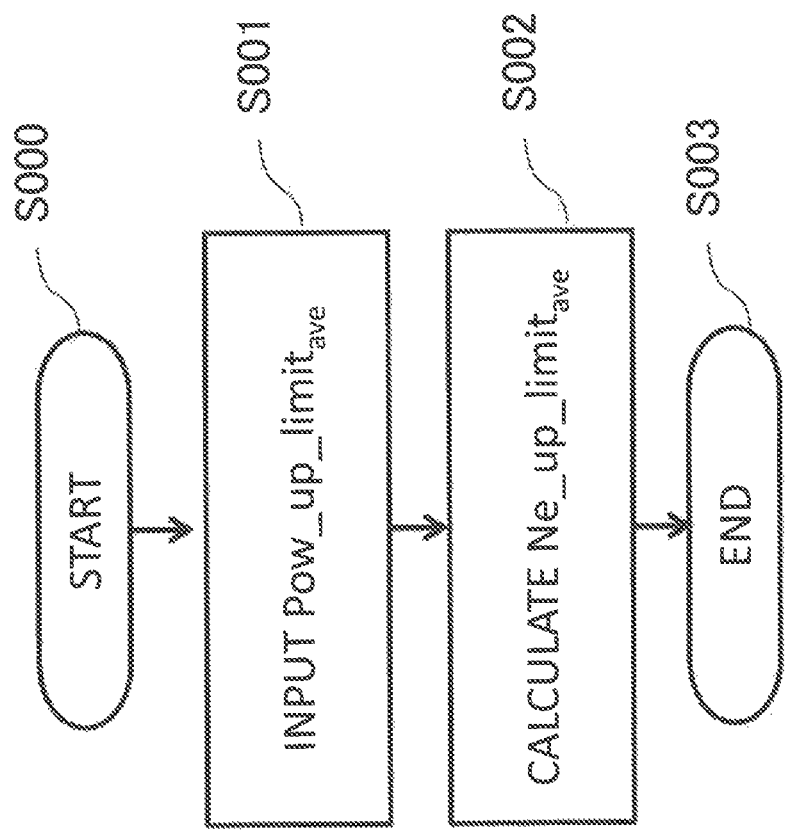
FIG. 11 is a flowchart for calculating an average engine speed upper limit value (Ne_up_limit$_{ave}$) before traveling according to embodiments 1 and 3 of the present invention.

Here, referring to FIG. 11, the method of determining the upper limit values Up_limit3 and Up_limit4 will be described. First, the above-mentioned average engine output power upper limit value (Pow_up_limitave) is input (S001).

Figure 12:
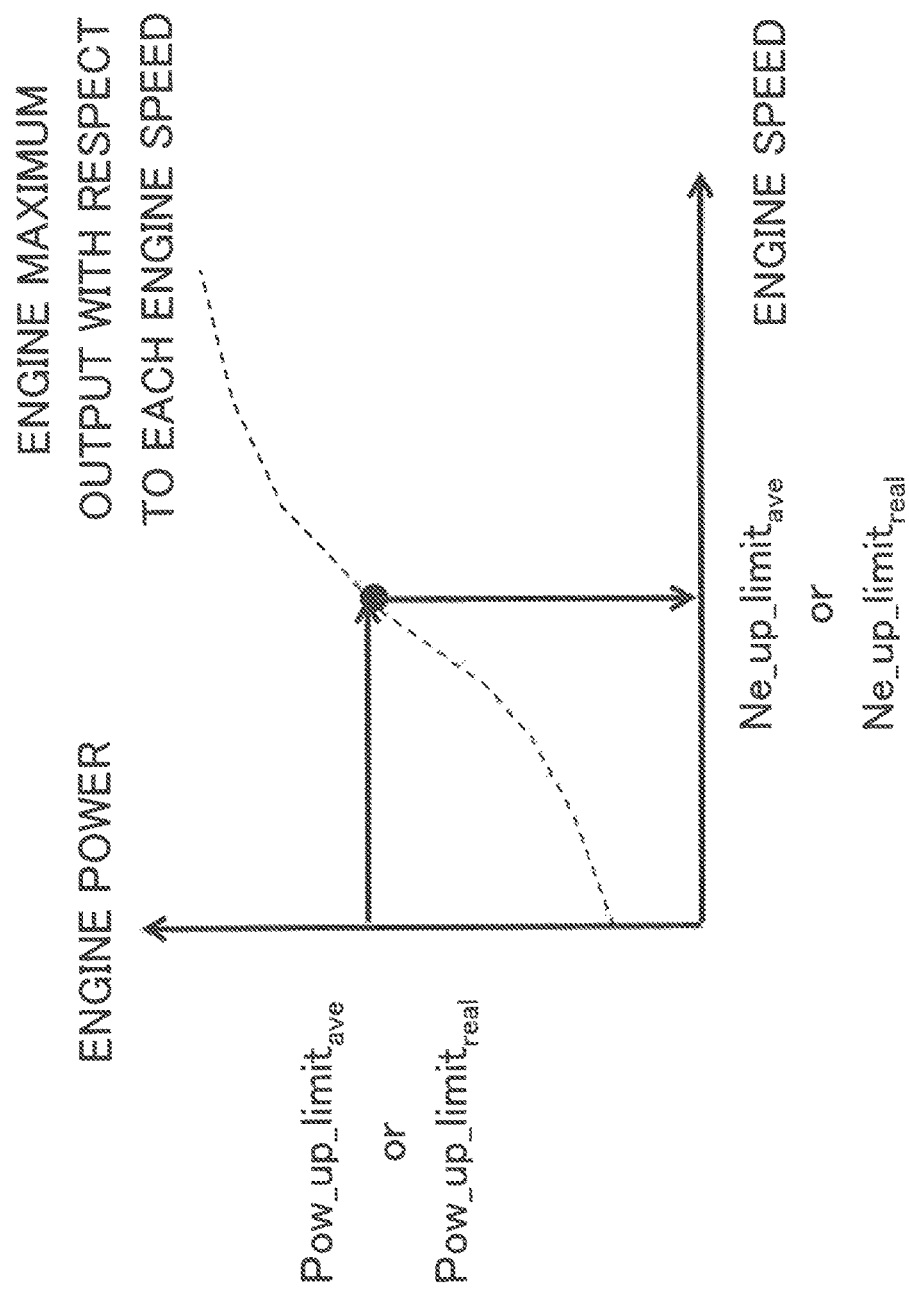
FIG. 12 is a diagram illustrating a method of calculating an average engine speed upper limit value (Ne_up_limit$_{ave}$, Ne_up_limit$_{real}$) from an average engine output power upper limit value (Pow_up_limit$_{ave}$, Pow_up_limit$_{real}$).
Figure 13:
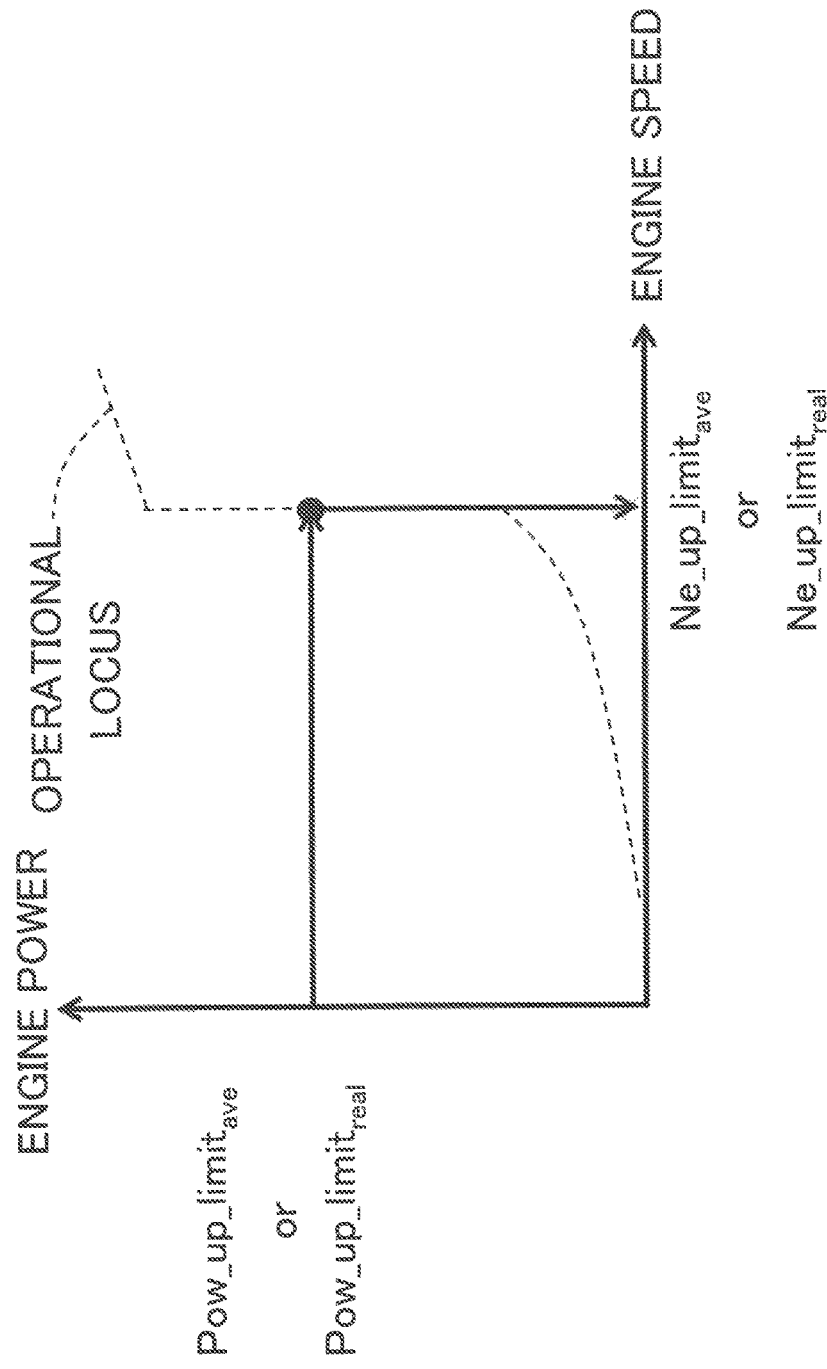
FIG. 13 is a diagram illustrating a method of calculating an average engine speed upper limit value (Ne_up_limit$_{ave}$, Ne_up_limit$_{real}$) from an average engine output power upper limit value (Pow_up_limit$_{ave}$, Pow_up_limit$_{real}$).
Figure 31:
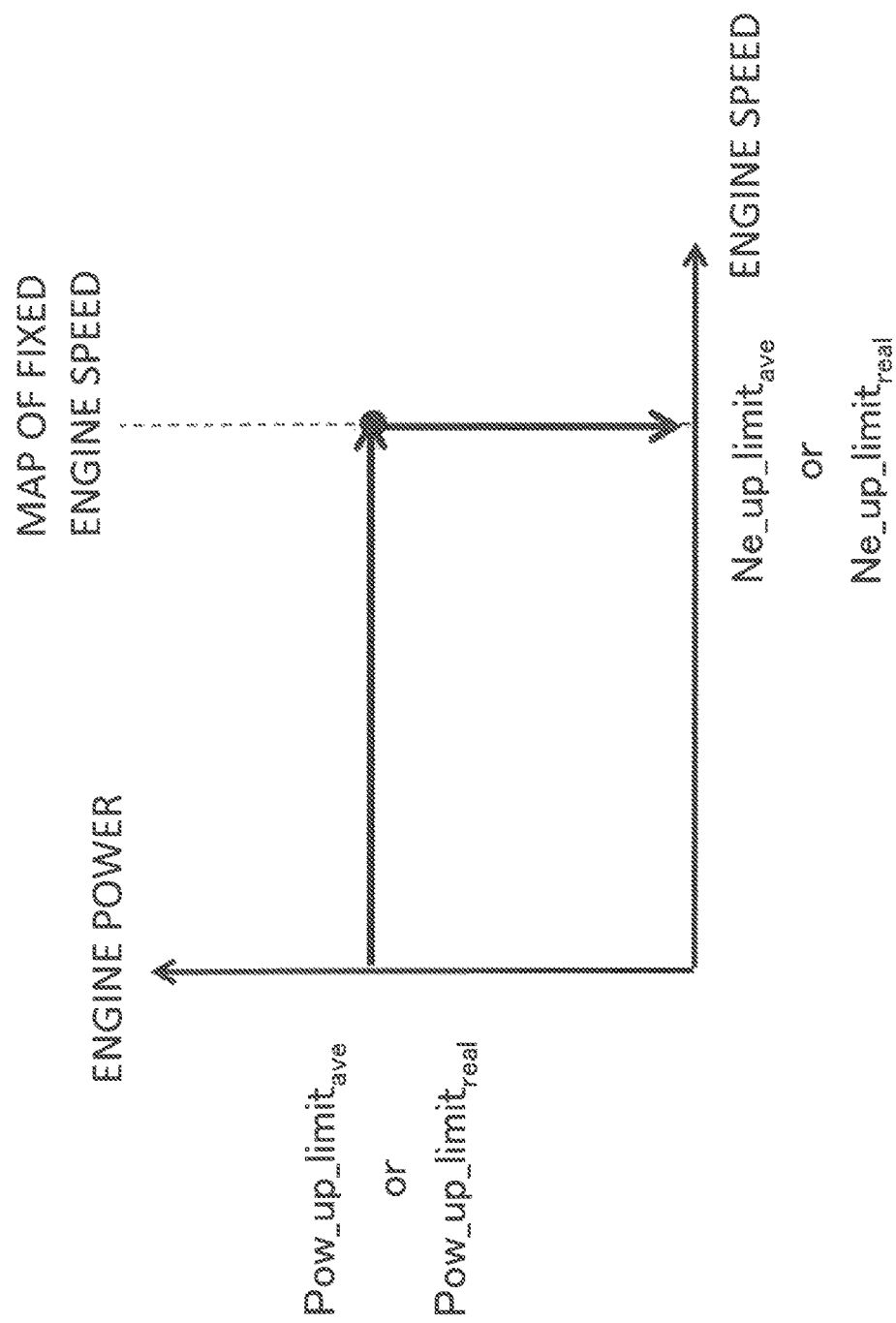
FIG. 31 is a diagram illustrating a method of calculating an average engine speed upper limit value (Ne_up_limit$_{ave}$, Ne_up_limit$_{real}$) from an average engine output power upper limit value (Pow_up_limit$_{ave}$, Pow_up_limit$_{real}$).

After this, the average engine output power upper limit value (Pow_up_limitave) input in step S001 is input to a predetermined function (map), and the average engine speed upper limit value (Ne_up_limitave) is determined (S002). For example, in a specific determining method, a map of the engine power and the engine speed as shown in FIG. 12 is utilized. By using information on the "maximum output value of the engine output power with respect to the engine speed" indicated by the broken line in FIG. 12, it is possible to calculate the average engine speed upper limit value (Ne_up_limitave) from the average engine output power upper limit value (Pow_up_limitave). In the case where, as shown in FIG. 13, for example, an operational point positively using the high efficiency region of the engine 1 and the generator are determined substantially uniquely as indicated by the broken line of FIG. 13, the average engine speed upper limit value (Ne_up_limitave) may be calculated from the average engine output power upper limit value (Pow_up_limitave) in accordance with the broken line. The operational locus of FIG. 13 is only given by way of example, and the engine speed upper limit may be determined by using some other locus. Further, in the case where a change in the operational range of the engine speed is not desired, the map may be set such that a fixed average engine speed upper limit value (Ne_up_limitave) is attained with respect to any average engine output power upper limit value (Pow_up_limitave) as shown in FIG. 31. The map shown in FIGS. 12, 13, and 31 is only given by way of example. It is possible to utilize some other map so long as it is a function (map) in which the engine speed is uniquely determined from the engine power.

In the case where the above calculation result is applied to the limiters 18 and 19, the calculation result of the loaded state is substituted for the Up_limit3, and the calculation result of the empty state is substituted for Up_limit4. As in the case of the limiters 25, 26, and 27, one or both of the threshold values (Mth and Tth) of FIG. 9 my be set in plural numbers, and when there is a work waiting time, the number of limiters (which is two in the example of FIG. 10) that can be selected by the MUX 22 may be increased in accordance with the number of the threshold values.

Figure 14:
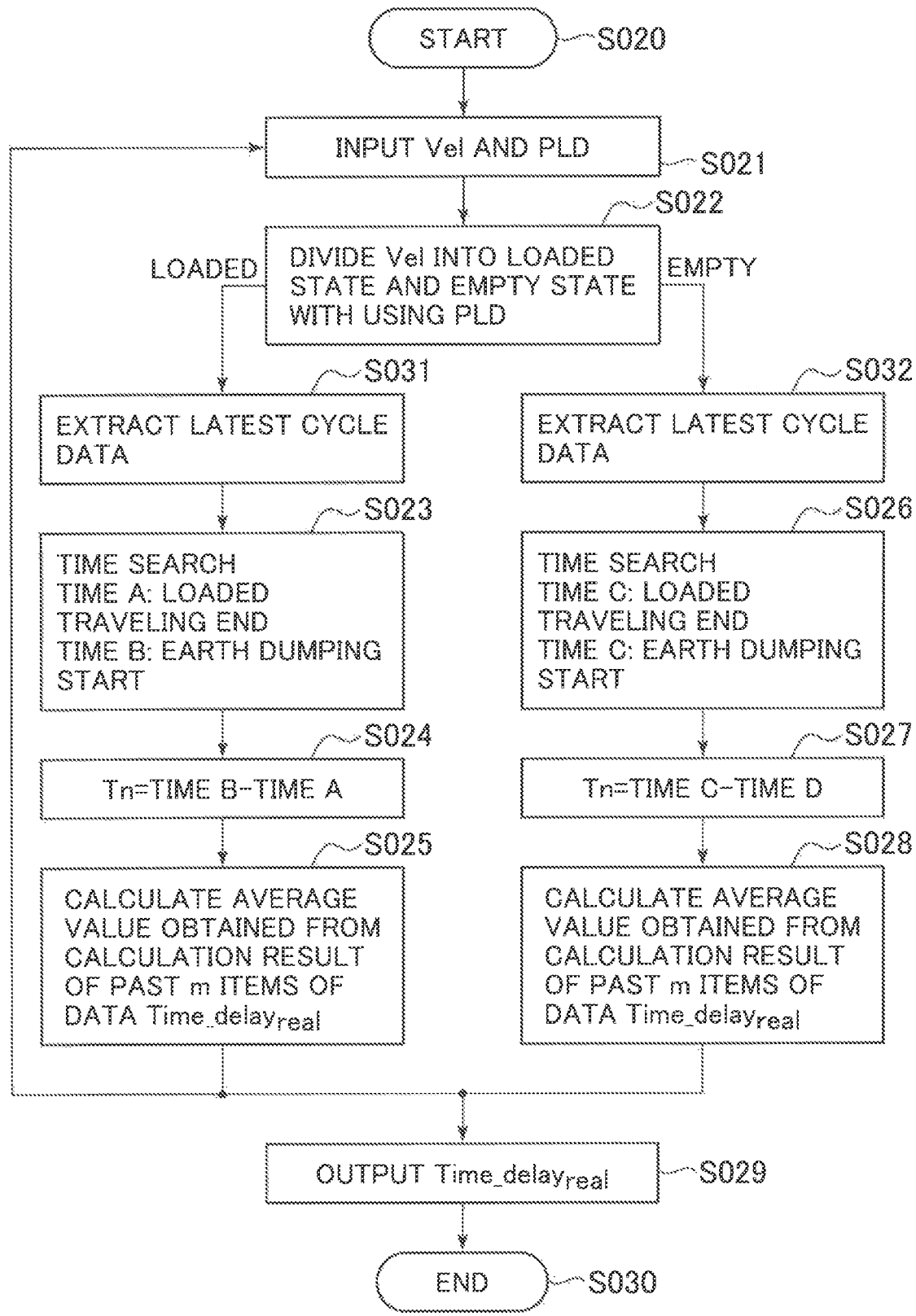
FIG. 14 is a flowchart for calculating an average (during traveling) work waiting time (Time_delay$_{real}$) during traveling.

Further, a work waiting time calculation section 15 will be described in detail with reference to FIG. 14. The work waiting time calculation section 15 calculates the work waiting time (Time_delay$_{real}$) by using real time traveling speed data (Vel) gained during traveling. FIG. 14 shows the flowchart for the calculation processing. First, time series data on the traveling speed (Vel) and the loading amount (PLD) gained during traveling is input (S021). After this, the traveling speed data is divided into data on the loaded state and data on the empty state by using the loading amount data (PLD) (S022). Then, most up-to-date one cycle data is extracted (S031). Next, in steps S023 and S024, the work waiting time (Time_delay(Tn)) is calculated. The method of calculating the work waiting time (Time_delay) is the same as that described with reference to FIG. 7. When, after the calculation of the work waiting time corresponding to one cycle, there is a work waiting time calculated prior to this time, the average value of the current data and the previously calculated latest m items of data is calculated to calculate the current average (during traveling) work waiting time (Time_delay$_{real}$) (S025). At this time, the number of data items m to be averaged is previously set. In this way, the calculation of the actual (average) work waiting time is executed for each cycle, whereby it is possible to calculate a work waiting time properly reflecting the situation of the construction site.

Figure 15:
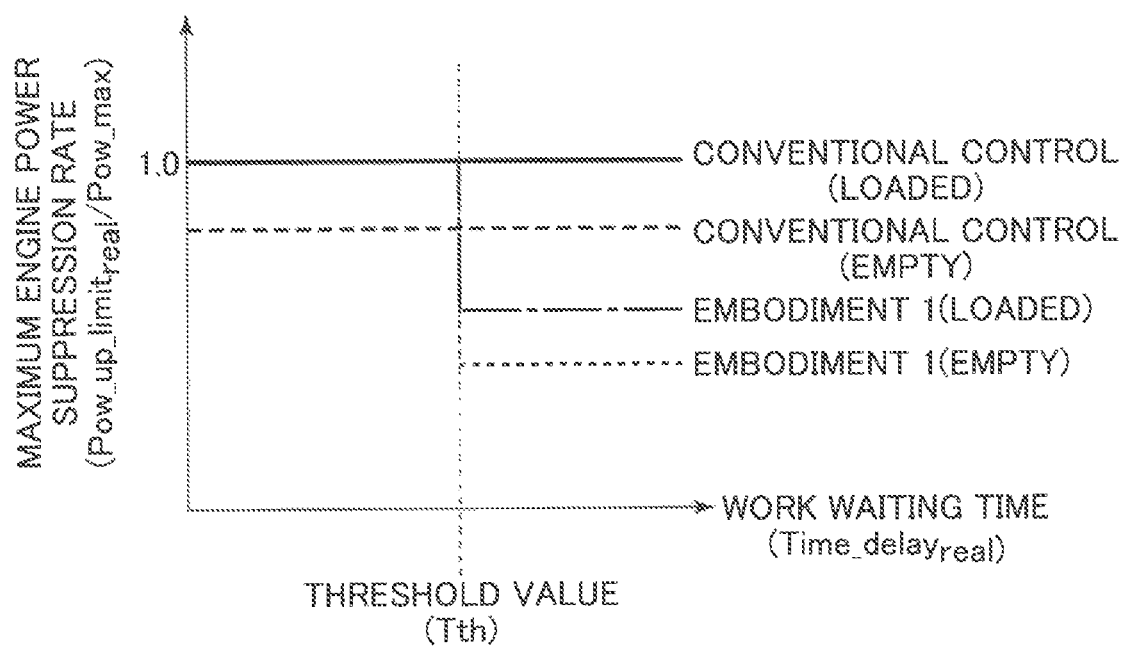
FIG. 15 is a diagram illustrating the relationship between a work waiting time and a maximum engine power suppression ratio in embodiments 1, 3, 5, and 7 of the present invention.

Here, the relationship between the work waiting time and the maximum engine output power suppression ratio in the present embodiment and that in the prior art were compared with each other. FIG. 15 shows the comparison result. The vertical axis indicates the maximum engine power suppression ratio (Pow_up_limit$_{real}$/Pow_max), and the horizontal axis indicates the work waiting time (Time_delay$_{real}$). In the prior art, the suppression of the engine power is executed solely in accordance with the loading amount (whether the vehicle is loaded or empty) independently of the work waiting time. On the other hand, in the present embodiment, the above-described controller is used, with the threshold value (Tth) of the work waiting time being a point of change, whereby it is possible to suppress the engine power taking into account the loading amount and the work waiting time. More specifically, in the present embodiment, the suppression of the engine power is not executed until the work waiting time exceeds the threshold value (Tth). At that time, the suppression amount is varied in accordance with the presence/absence of the load, and, while doing so, the work waiting time is also taken into consideration, so that the suppression amount can be of a larger value than in the prior art (From the viewpoint of the suppression ratio of FIG. 15, it is set to be a value smaller than in the prior art). Further, in FIG. 15, the power suppression control of the present embodiment is set such that the engine power suppression amount increases stepwise in accordance with an increase in the work waiting time. In other words, in the case where the work waiting time is the same, the engine power suppression amount is larger when the loading amount is small.

Figure 32:
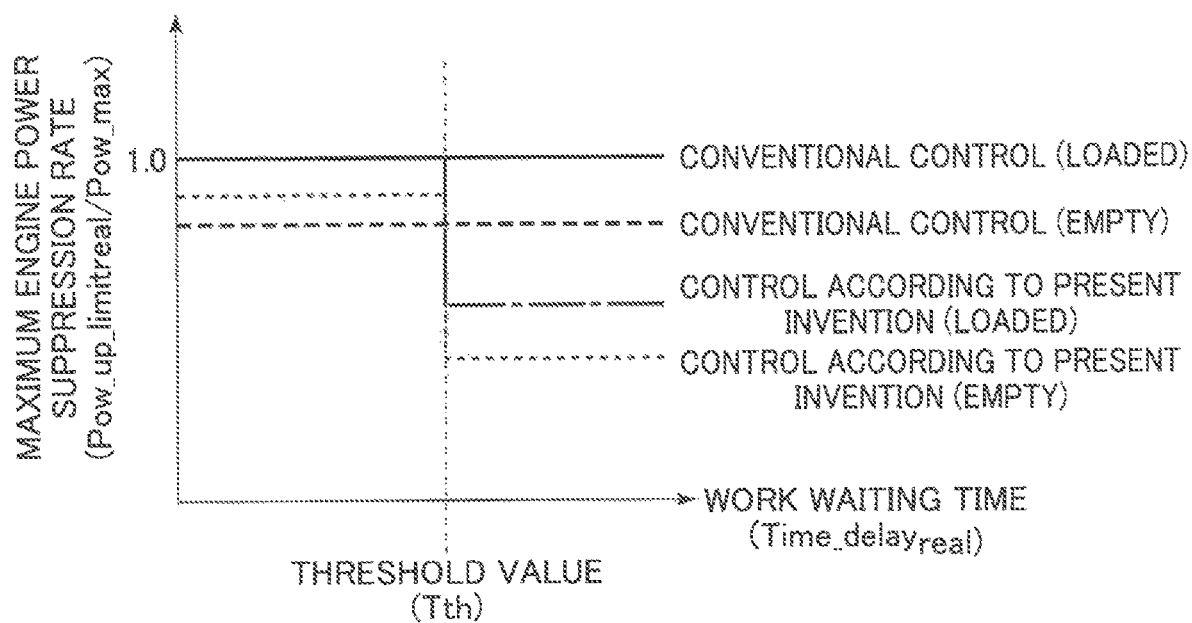
FIG. 32 is a diagram illustrating the relationship between the work waiting time and the maximum engine power suppression ratio in embodiments 1, 3, 5, and 7 of the present invention.

While in FIG. 15 the maximum engine power suppression ratio in the control according to embodiment 1 is 1 when the waiting time is zero, it is not always necessary the power suppression ratio to be 1. For example, independently of the work waiting time, in the case where there is mounted in the vehicle manual or automatic means for adjusting the engine output power in accordance with the engine load such as the loading amount, for example, in the empty state, no large output power is required, so that, as shown in FIG. 32, even when the work waiting time is zero, the maximum engine power suppression ratio may be less than 1.

As described above, in the dump truck of the present embodiment, when, first, the work waiting time (Time_delay$_{real}$) of the same kind of work cycle (loading operation/earth disposal operation) is not less than the threshold value (Tth), a work waiting time is regarded to have been generated even in the current work cycle, and the control to increase the engine power suppression amount (power suppression control) is executed by the ECU 7. As the index for determining the degree to which the engine power is to be suppressed during the power suppression control, the "presence/absence of the load (loading amount)" and the "magnitude of the gradient value (gradient value correction value) of the movement route to the destination," which are the indexes indicating the engine load during traveling, are taken into consideration, and, while doing so, the engine power suppression amount during power suppression control was determined by using formulas (1) through (4) such that the traveling time is elongated by an amount corresponding to the average value of the work waiting time (Time_delay). In the dump truck of the present embodiment constructed as described above, in the case where the work waiting time is regarded to be being generated, the engine power is suppressed so that the traveling time is elongated by using the average value of the work waiting time as a standard, so that the arrival at the destination is positively delayed within the range of the work waiting time, whereby it is possible to reduce the fuel consumption amount without elongating the work cycle, with the result that an improvement in terms of transportation efficiency and a reduction in fuel consumption become compatible with each other.

Figure 16:
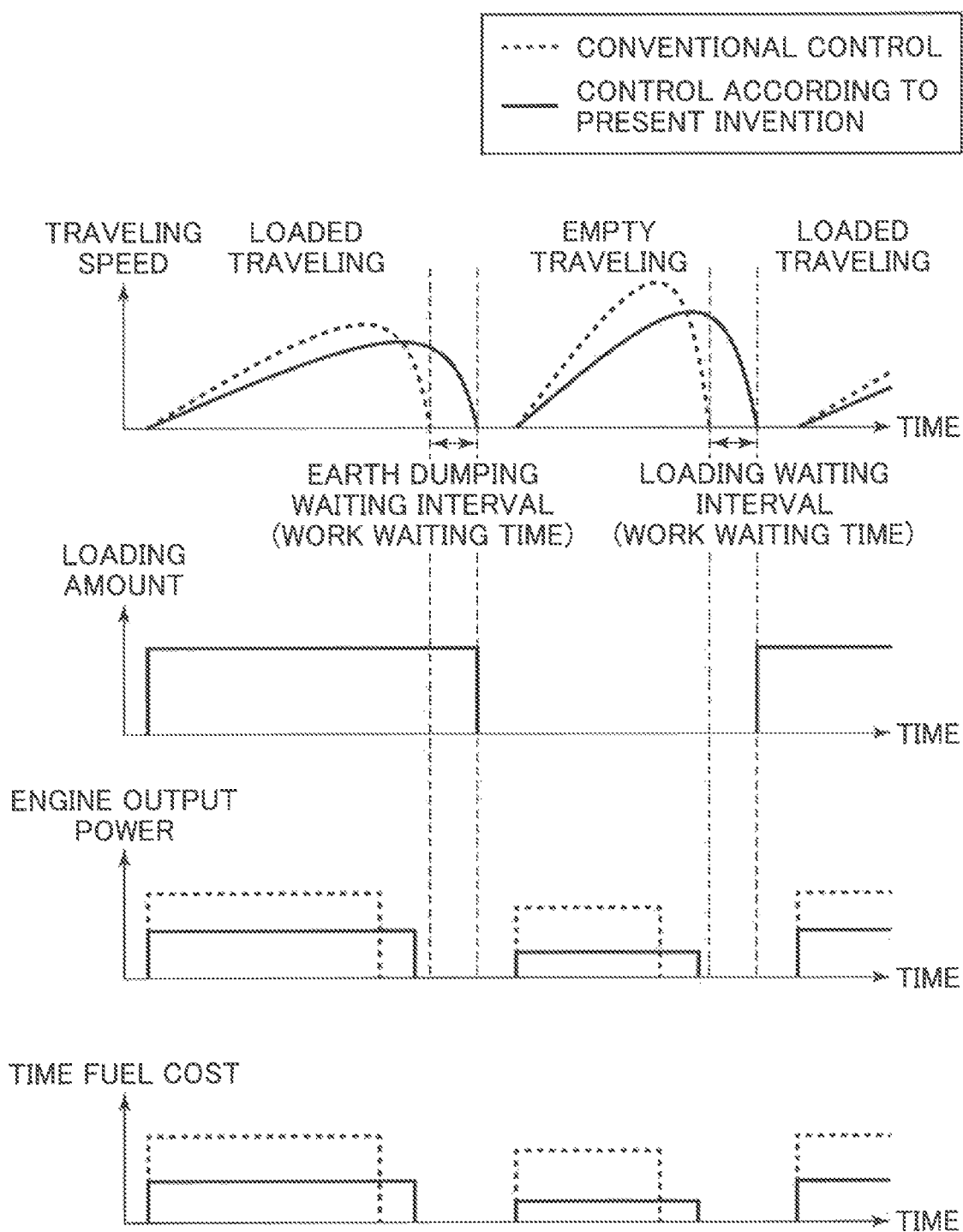
FIG. 16 is a diagram illustrating an example of time series data on a traveling speed, a loading amount, an engine output power, and time fuel cost in the case where embodiment 1 is applied.

Next, the effect of the present embodiment will be described with reference to FIG. 16. FIG. 16 shows the case where the work waiting time in the past and the current work waiting time during traveling coincide with each other. Further, only 100% and 0% are used as the accelerator opening.

First, in the loaded state, solely engine output power control in accordance with the loading amount is performed in the conventional control, so that no engine output power control in accordance with a work waiting time is performed, with the result that a work waiting time is generated. In contrast, in the present embodiment, the work waiting time can be taken into consideration, so that, as can be seen, traveling is possible with the engine output power reduced as compared with the prior art. This also applies to the empty traveling. Further, the fuel consumption can be reduced by an amount corresponding to the suppression of the engine output power, so that, by employing the present embodiment, an improvement in terms of transportation efficiency and a reduction in fuel consumption amount become compatible with each other.

In the above-described case, the loading state of the mine dump truck is substantially either a full loaded state or an empty state. In view of this, there is adopted a control in which in the case where the work waiting time exceeds the threshold value (Tth), the magnitude in which the engine power suppression amount is selectively varied in accordance with the presence/absence of the load. However, in the case, for example, where the invention is applied to a haulage vehicle used in an environment in which the loading amount is varied as appropriate, the power suppression control may be executed such that the engine power suppression amount is continuously (in a linear/curved fashion) in accordance with a reduction in the loading amount. In this case, for example, when the loading amount is 50% of the full loading amount, the maximum engine power suppression ratio is determined by the horizontal straight line situated between the loaded state and the empty state of embodiment 1 shown in FIG. 15.

Further, while in the above example the power suppression control is executed only in the case where the work waiting time exceeds the threshold value (Tth), it is also possible to set a plurality of threshold values of the work waiting time, executing the power suppression control such that the engine power suppression amount increases stepwise (in a dispersed fashion) as the work waiting time is elongated. Further, instead of utilizing a threshold value, the power suppression control may be executed such that the engine power suppression amount increases monotonously in accordance with an increase in the work waiting time.

Further, while in the above-described example the average traveling speed after the power suppression is calculated by formula (1) based on the average value (i.e., predicted value) of the work waiting time, it is also possible to calculate the traveling speed after the power suppression for each work cycle based on an arbitrary work waiting time (e.g., the work waiting time of the nearest cycle of the same kind) within the range of the actual work waiting time, determining the power suppression amount for each work cycle from the traveling speed.

Further, in the above-described example, in the case where it is determined that a work waiting time is to be generated, the power suppression control is executed anywhere on the way to the destination. In the case, however, where the section in which the engine output power is larger than in the other sections is predictable or known from various items of information including the gradient of the traveling road, road surface, etc., it is possible to adopt a construction in which power suppression is concentrated on that section of the sections in the vicinity thereof. That is, the power suppression control may be executed in a part of the way leading to the destination.

Embodiment 2

In the present embodiment, a description of the things already described in connection with embodiment 1 will be left out (This also applies to the other embodiments). For example, the basic mechanism in which it is possible to achieve compatibility between an improvement in terms of transportation efficiency and a reduction in fuel consumption amount by taking the work waiting time into consideration is the same as that of embodiment 1.

Figure 18:
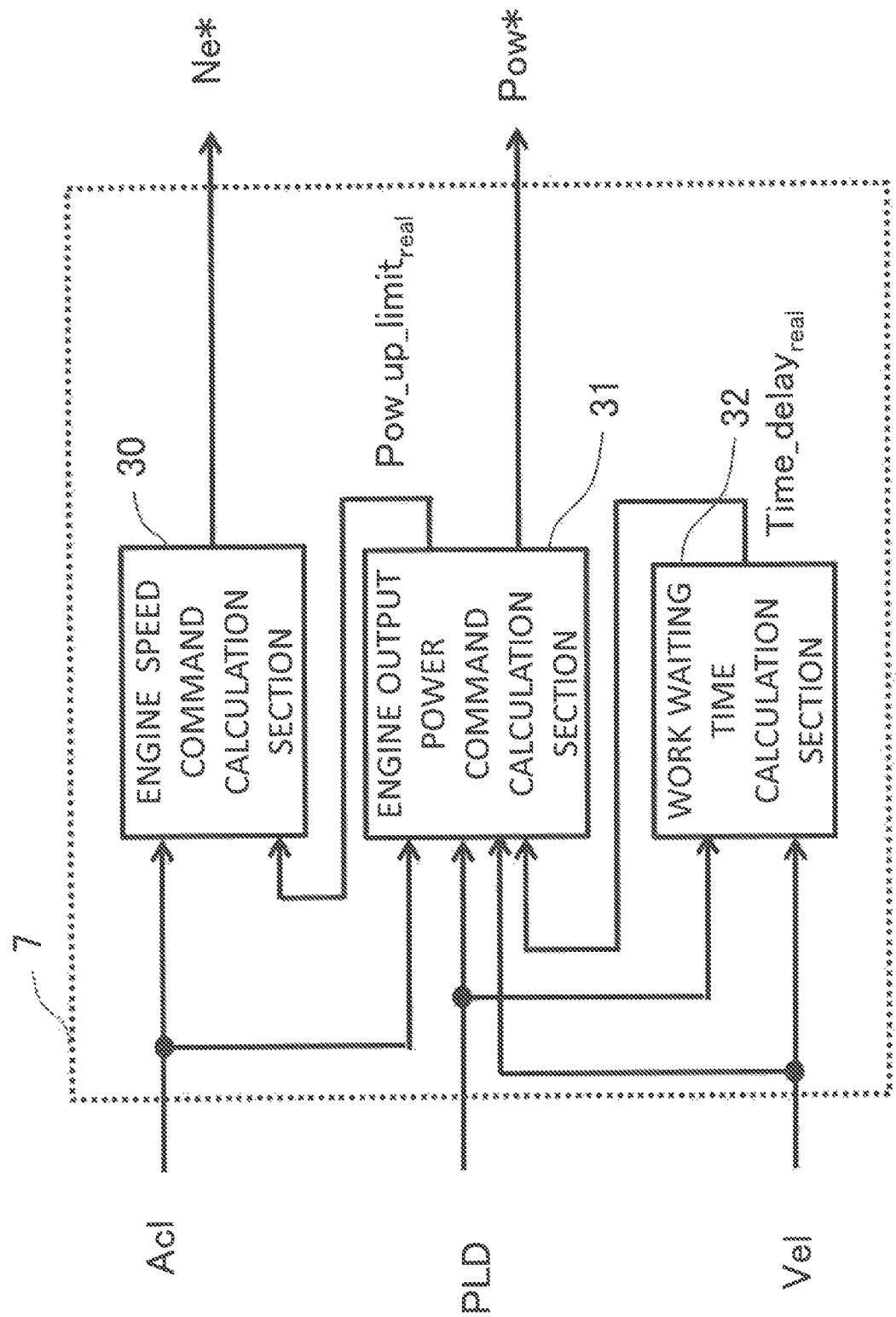
FIG. 18 is a control block diagram illustrating processing by an ECU 7 of embodiments 2 and 4 of the present invention.

FIG. 18 shows the construction of the ECU 7 according to the present embodiment. The difference between the present embodiment and embodiment 1 lies in the fact that while in embodiment 1 the upper limit value of the limiter is previously calculated, in the ECU 7 of the present embodiment, the upper limit value of the limiter (Up_limit5, Up_limit6) is calculated in real time based on data related to the work cycle of the same kind (loaded/empty) as that at the time of control (e.g., the loading amount (PLD), the traveling speed (Vel), the average (during traveling) work waiting time (Time_delay$_{real}$), and the accelerator opening (Acl)).

As in embodiment 1, the function block of the ECU 7 of the present embodiment can be divided into three sections, and the work waiting time calculation section 32 is of the same function as the work waiting time calculation section 15 of embodiment 1. Here, the engine speed command calculation section 30 and the engine output power command calculation section 31 will be described.

The engine output power command calculation section 31 inputs the accelerator opening (Acl), the loading amount (PLD), and the average (during traveling) work waiting time (Time_delay$_{real}$), and outputs the engine output power command (Pow*) and the engine output power upper limit value (Pow_up_limit$_{real}$). The engine speed command calculation section 30 inputs the accelerator opening (Acl) and the engine output power upper limit value (Pow_up_limit$_{real}$), and outputs the engine speed command (Ne*).

Figure 19:
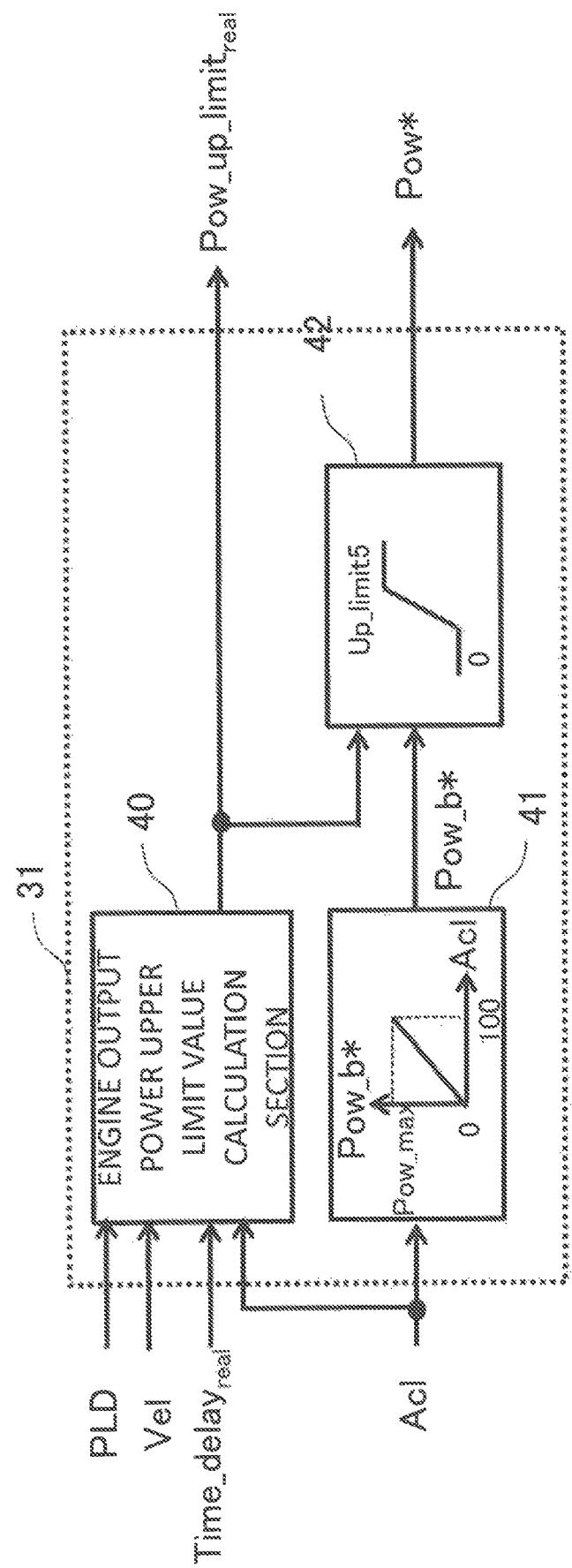
FIG. 19 is a control block diagram illustrating processing by an engine output power command calculation section 31 of embodiments 2 and 4 of the present invention.

Referring to FIG. 19, the engine output power command calculation section 31 will be described. The map 41 of the engine output power command calculation section 31 outputs a temporary engine output power command value (Pow_b*) based on the input accelerator opening (Acl). The map 41 calculates the engine output power command value (Pow_b*) in the case where no power suppression is effected. The calculated Pow_b* is input to the limiter 42, and is utilized as Up_limit5 (described below) when the work waiting time (Time_delay$_{real}$) of a work cycle of the same kind as the current one (when control is performed) is zero (when no power suppression is effected).

The lower limit value of the limiter 42 is 0, and the upper limit value thereof is Up_limit5. Up_limit5 is determined by the engine output power upper limit value calculation section 40 or the map 41. The engine output power upper limit value calculation section 40 calculates the engine output power upper limit (Pow_up_limit) by using as the input the loading amount (PLD), the traveling speed (Vel), the average (during traveling) work waiting time (Time_delay$_{real}$), and the accelerator opening (Acl).

Figure 20:
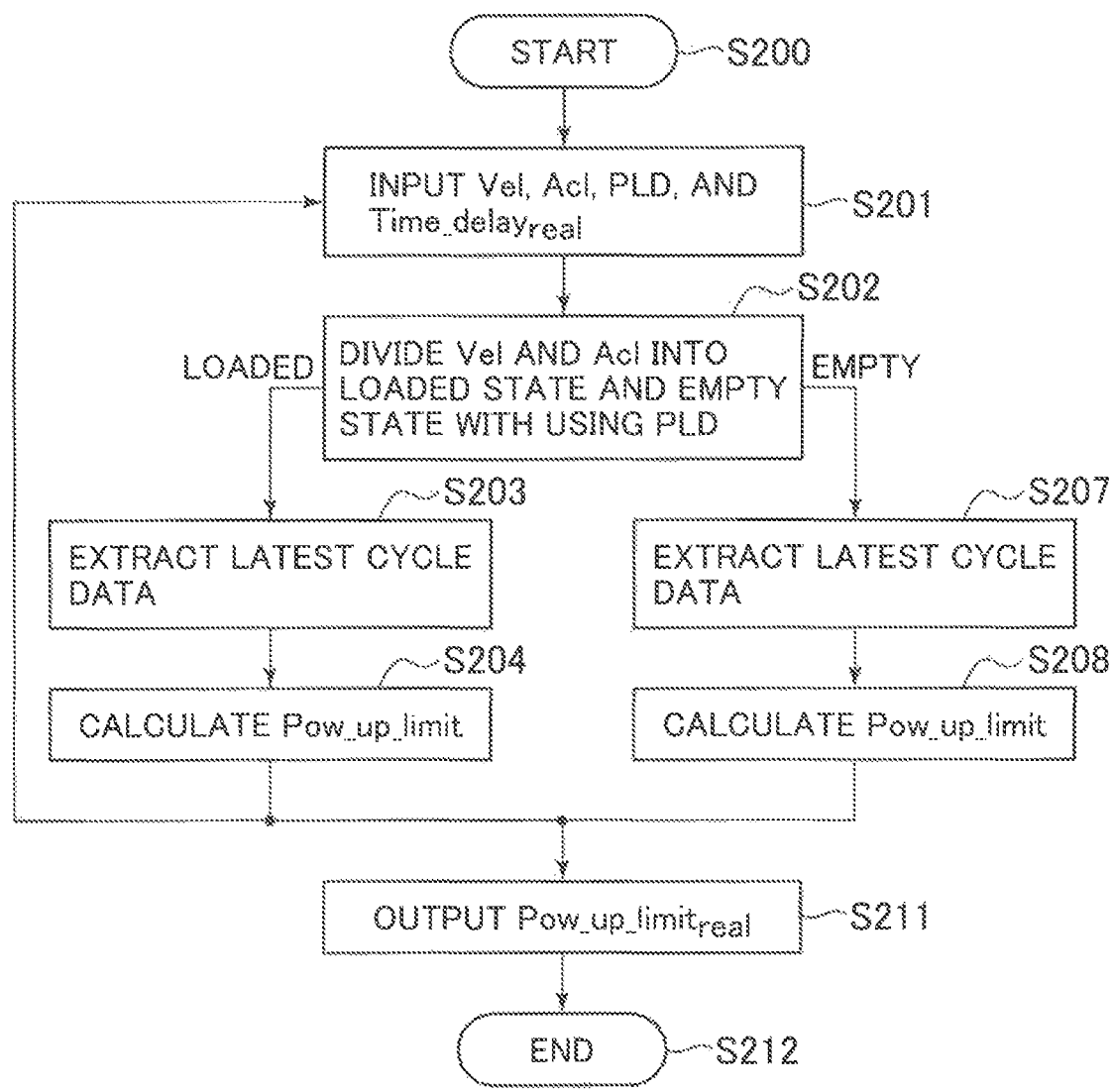
FIG. 20 is a flowchart for calculating an engine output power upper limit value (Pow_up_limit$_{real}$) during traveling in embodiments 2 and 4 of the present invention.

FIG. 20 shows a detailed calculation flow chart for execution by the engine output power upper limit value calculation section 40. Here, solely the processing in the loaded state will be described, and a description of the processing in the empty state will be left out.

First, the engine output power upper limit value calculation section 40 inputs the loading amount (PLD), the traveling speed (Vel), the average (during traveling) work waiting time (Time_delay$_{real}$), and the accelerator opening (Acl) (S201), and then divides the data on the traveling speed (Vel) and the accelerator opening (Acl) into the loaded state and the empty state based on the information on the loading amount (PLD) (S202). After this, data on the latest 1 cycle of the loaded state (hereinafter sometimes referred to as 1 cycle data) is extracted from the data divided in S202 (S203), and the engine output power upper limit (Pow_up_limit) with respect to the 1 cycle data is calculated (S204). The method of calculating the engine output power upper limit (Pow_up_limit) with respect to the 1 cycle data of S204 is substantially the same as that described with reference to FIG. 5 in connection with embodiment 1 using the formulas (1) through (4), etc., so a description thereof will be left out. The engine output power upper limit value (Pow_up_limit$_{real}$) calculated in step S204 is output to the limiter 42, the PCU 8, and the display device 10 (S211). The engine output power upper limit value (Pow_up_limit$_{real}$) output to the limiter 42 is substituted for Up_limit5 in the case where a work waiting time (Time_delay$_{real}$) is generated.

In the case where the traveling route is changed, the engine output power upper limit value (Pow_up_limit$_{real}$) is rest, and the calculation flow of FIG. 20 is executed again, whereby the engine output power upper limit value (Pow_up_limit$_{real}$) of the new route data is calculated again.

Figure 21:
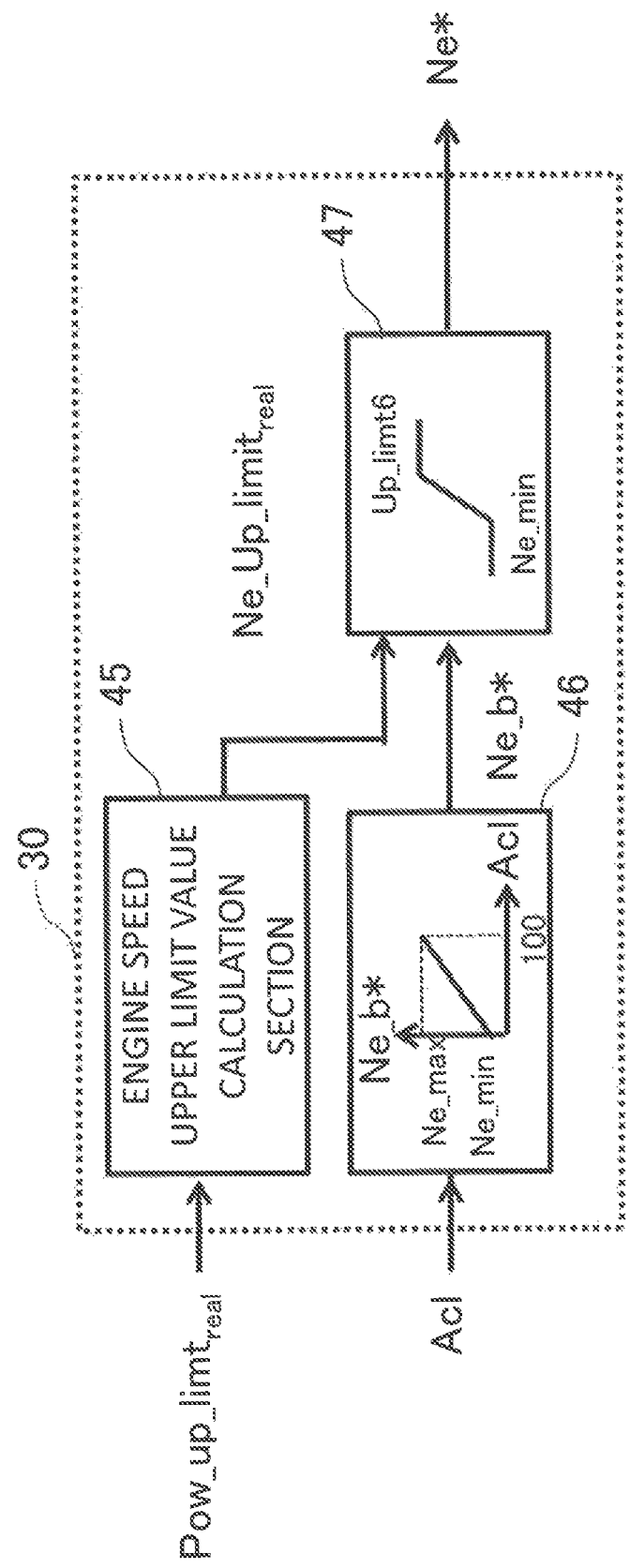
FIG. 21 is a control block diagram illustrating processing by an engine speed command calculation section 30 of embodiments 2 and 4 of the present invention.

Next, the engine speed command calculation section 30 will be described with reference to FIG. 21. The map 46 outputs a temporary output engine speed command value (Ne_b*) based on the accelerator opening (Acl) input to the engine speed command calculation section 30. This command value (Ne_b*) serves as the engine speed command value in the case where no power suppression is effected. The calculated Ne_b* is input to the limiter 47, and is used as Up_limit6 (described below) in the case where the work waiting time (Time_delay$_{real}$) of the same work cycle as the current one (at the time of control) is zero (in the case where no power suppression is effected). The lower limit value of the limiter 47 is the idling speed (Ne_min) determined by the engine 1, and the upper limit value thereof is Up_limit6. The Up_limit6 is determined by the engine speed upper limit value calculation section 45 or the map 46.

The engine speed upper limit value calculation section 45 inputs the engine output power upper limit value (Pow_up_limitreal) and calculates the engine speed upper limit value (Ne_up_limitreal). The detailed calculation flow for the engine speed upper limit value (Ne_up_limitreal) corresponds to what is obtained by changing the affix "ave" in FIG. 11 referred to in the description of embodiment 1 to "real," so a description thereof will be left out. The maps of FIGS. 12, 13, and 31 utilized in the calculation flow of FIG. 11 can also be utilized in the present embodiment. However, a description thereof will be left out as in the case of FIG. 11.

Figure 22:
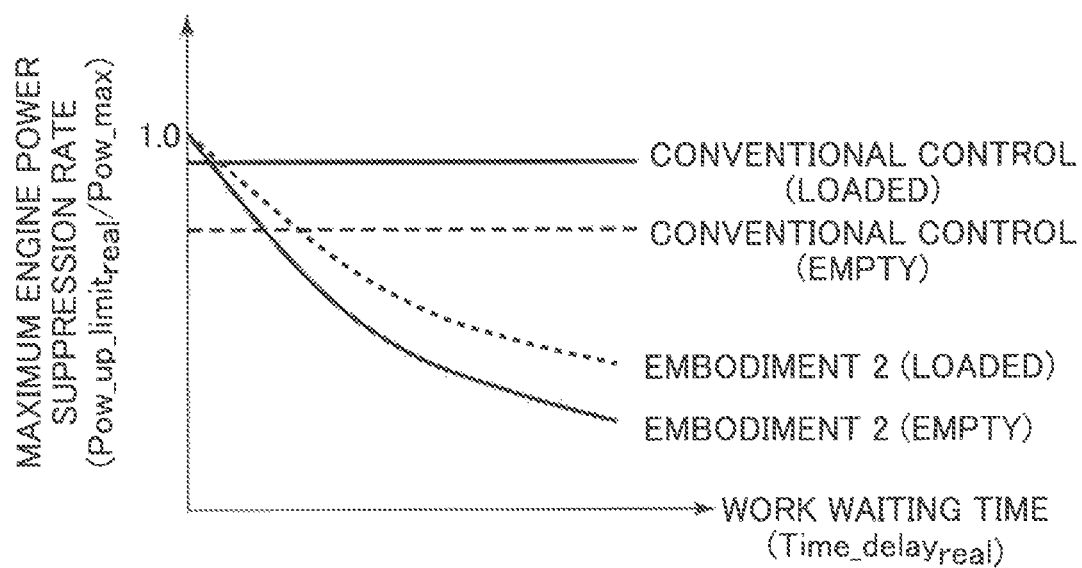
FIG. 22 is a diagram illustrating the relationship between the work waiting time and the maximum engine power suppression ratio in embodiments 2, 4, 6, and 8 of the present invention.

Here, FIG. 22 shows the result of the comparison of the relationship between the work waiting time and the engine output power suppression amount in the present embodiment with that in the prior art. The present embodiment adopts the above-described logic construction, whereby, as compared with the case of embodiment 1 shown in FIG. 15, it is possible to suppress the engine output power such that it increases monotonously as the work waiting time increases. By employing the present embodiment, there is no need to previously calculate the engine output power upper limit value and the like, and it is possible to perform more fine control on the engine output power with respect to variation in the work waiting time, so that it is possible to enhance the transportation efficiency and the fuel consumption reduction effect.

Figure 33:
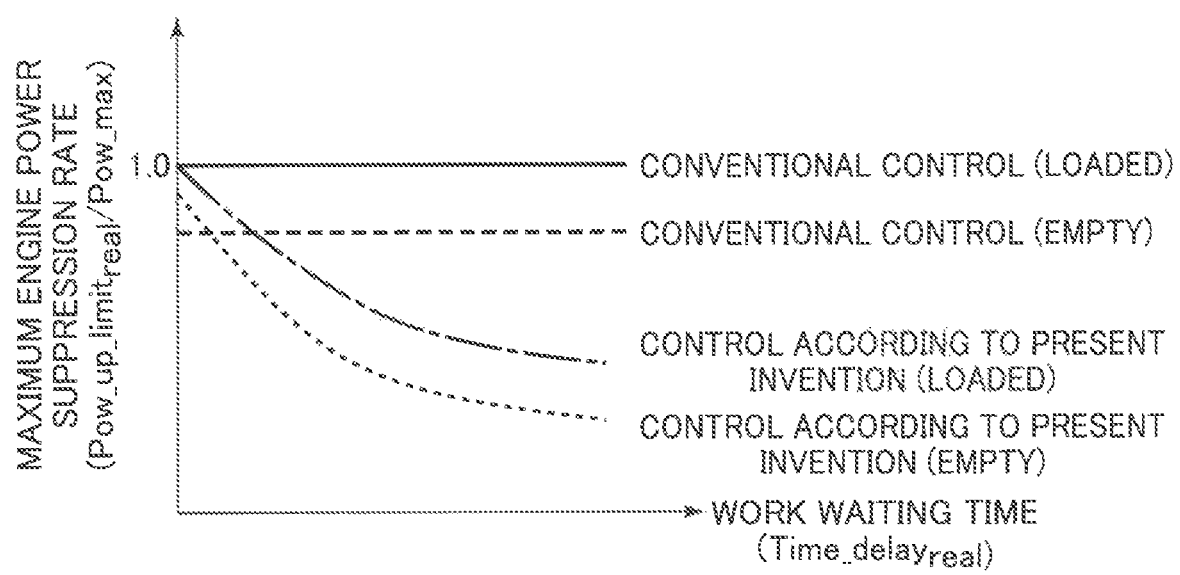
FIG. 33 is a diagram illustrating the relationship between the work waiting time and the maximum engine power suppression ratio in embodiments 2, 4, 6, and 8 of the present invention.

While in FIG. 22 the maximum engine power suppression ratio in the control according to the present embodiment is 1 when the waiting time is zero, it is not always necessary the power suppression ratio to be 1. For example, in the case where there is mounted in the vehicle manual or automatic means for adjusting the engine output power in accordance with the work load such as the loading amount, for example, in the empty state, no large output power is required, so that, as shown in FIG. 33, when the work waiting time is zero, the maximum engine power suppression ratio may be less than 1.

Further, in calculating the engine output power upper limit (Pow_up_limit), instead of the flow of FIG. 20, it may be determined whether the work sate at the time of control is the loading operation or the earth disposal operation, and the latest cycle data related to the same work state as the determination result may be input, executing the computation processing according to S204 or S210. Further, while in FIG. 20 the average value of the m data items in the past is utilized as the work waiting time (Time_delay$_{real}$), it is also possible to utilize the work waiting time (Time_delay$_{real}$) of the latest cycle related to the same work state as that of the determination result.

Embodiment 3

Figure 23:
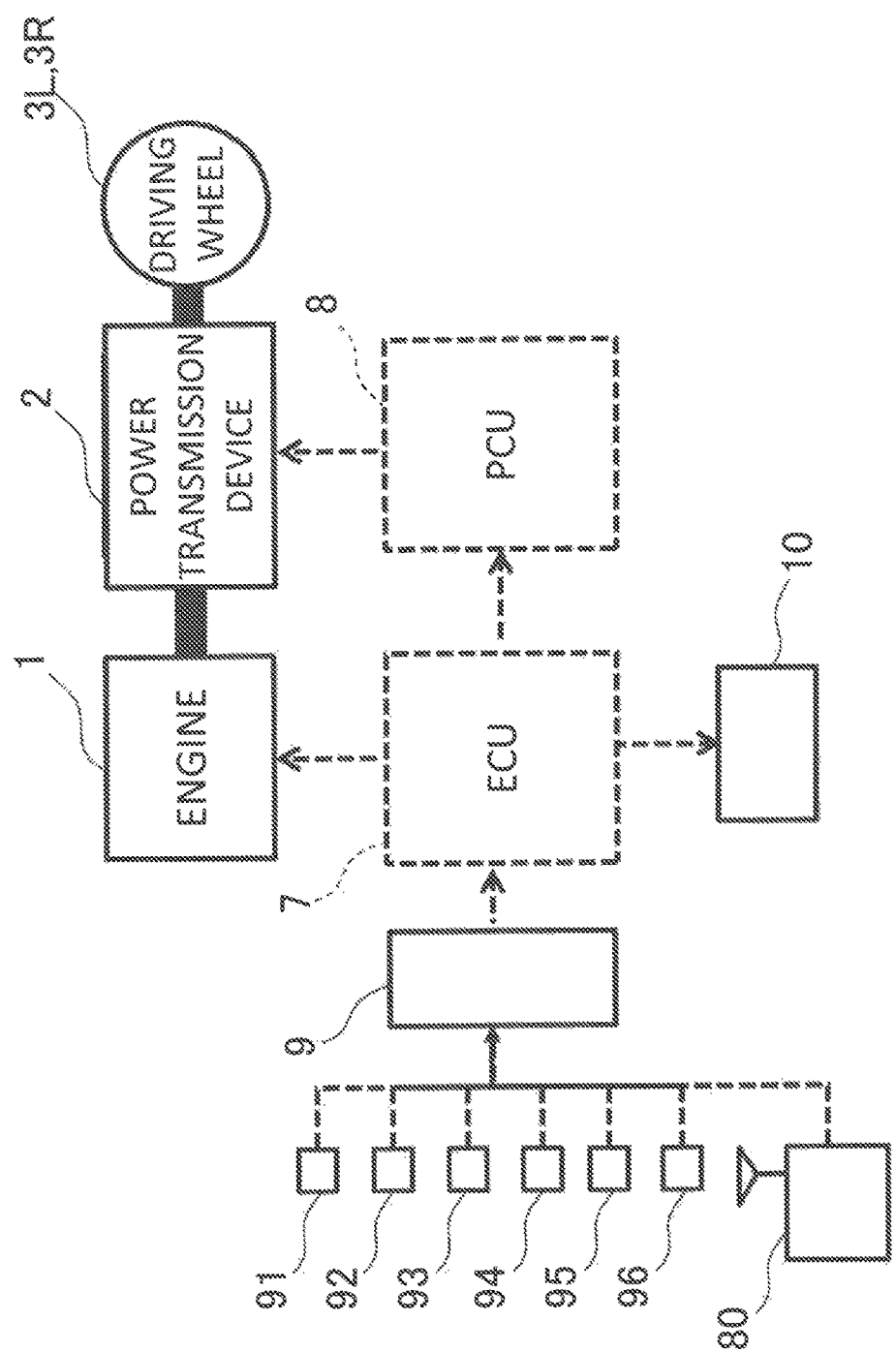
FIG. 23 is a system block diagram illustrating embodiment 3 of the present invention.

FIG. 23 is a system block diagram related to the dump truck of the present embodiment. As shown in the drawing, the dump truck of the present embodiment is equipped with a wireless communication device 80 for performing communication between vehicles (between two dump trucks, or between a dump truck and a work machine), and communication with a control tower managing the operation control on vehicles.

Figure 2:
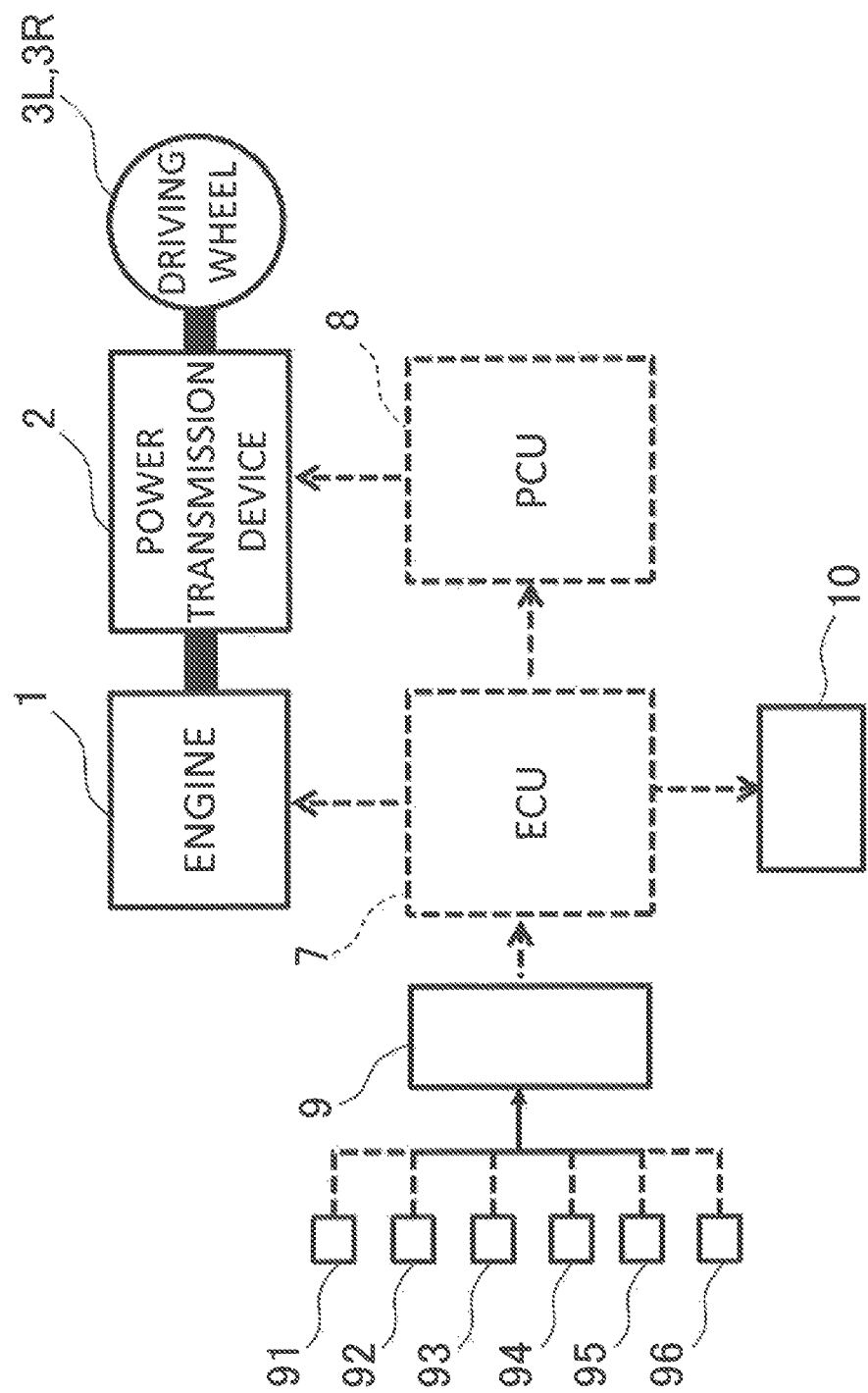
FIG. 2 is a system block diagram of embodiment 1 of the present invention.

The difference between embodiment 3 and embodiment 1 lies in the construction of the traveling data gaining device 9 shown in FIG. 2 and the method of calculating the work waiting time (Time_delay$_{real}$). Otherwise, the present embodiment is the same as embodiment 1. In addition to the data from various sensors gained via the in-vehicle CAN of embodiment 1, the traveling data gaining device 9 gains in detail via the wireless communication device 80 data on other dump trucks traveling through the same route and on the work machine arranged at the destination of the own vehicle (the loading place/the earth dumping site) (e.g., a hydraulic excavator for loading, or a wheel loader carrying the earth and sand disposed of; here, the hydraulic excavator will be taken as an example). The traveling data gaining device 9 gains the accelerator opening (Acl), the loading amount (PLD), the traveling speed data (Vel), etc. of the own vehicle via the in-vehicle CAN and various sensors 91 through 96. On the other hand, via the wireless communication device 80, there are gained the accelerator opening (Acl), the loading amount (PLD), the traveling speed data (Vel) of another vehicle. Further, from the hydraulic excavator, there is gained, for example, information on the time interval (ΔThorn) at which the horn of the hydraulic excavator (the signal calling the dump truck to perform loading next) is honked.

Figure 34:
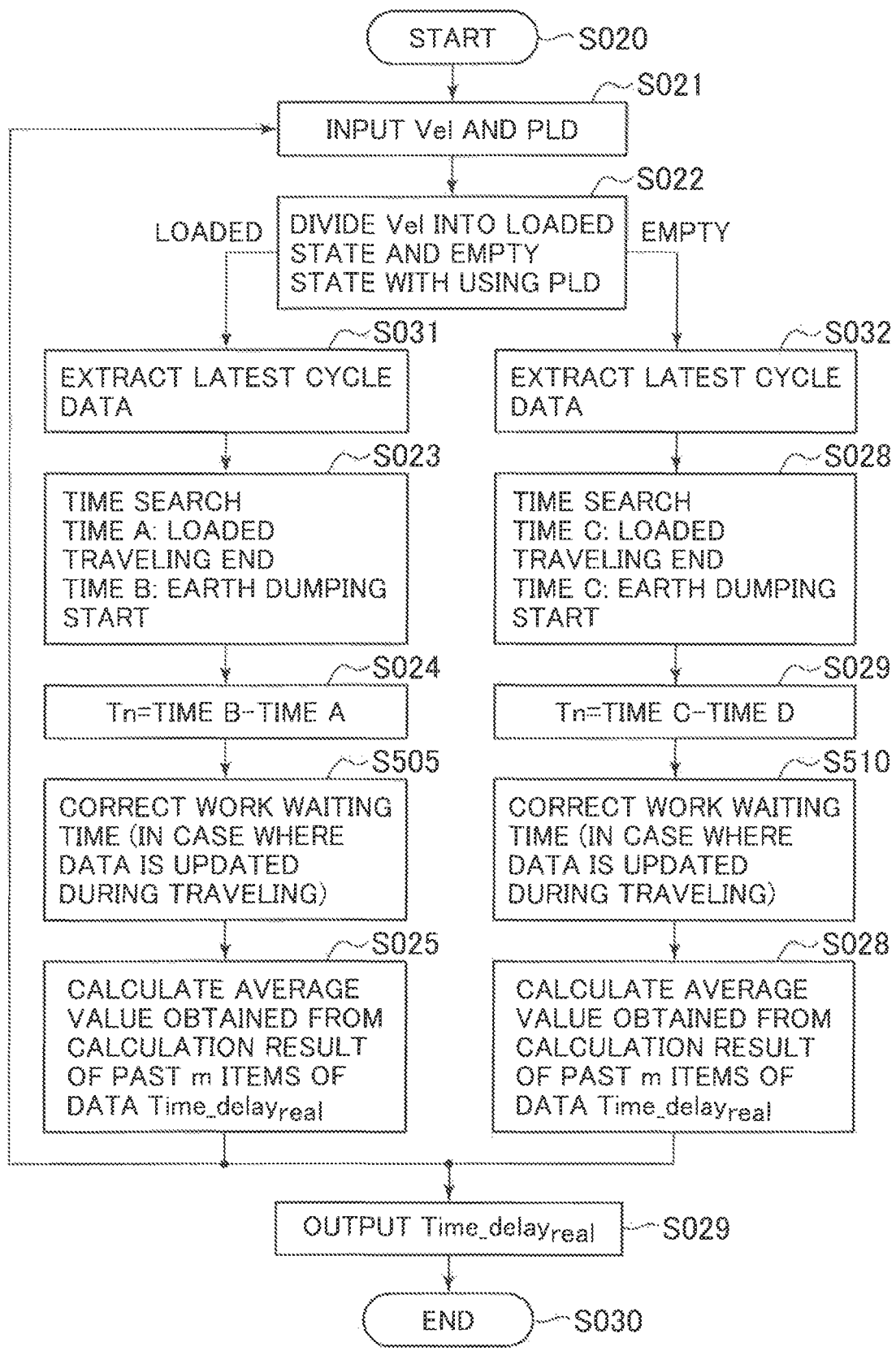
FIG. 34 is a flowchart for calculating an average (during traveling) work waiting time (Time_delay$_{real}$) during traveling in embodiment 3 of the present invention.

The calculation flow of the work waiting time (Time_delay$_{real}$) in the case where information is gained from another vehicle via the wireless communication device 80 and various sensors 91 through 96 will be described with reference to FIG. 34. Also the data on the other vehicle of the same route, rating, and vehicle performance is gained via the wireless communication device 80, and the processing is basically the same as that of FIG. 14 other than the processing of steps S505 and S510, so the description will be partly left out. In the present embodiment, data received from other vehicles, etc. via the wireless communication device 80 is input in detail to update the information on the own vehicle that is traveling. The work waiting time calculation section 15 is constructed such that when the procedure has advanced to step S030, a series of processing operations are executed again starting from step S020 at the point in time when data input from the own vehicle or another vehicle becomes possible.

In step S021, regarding the own vehicle and other vehicles (one or more) of the same route, rating, and vehicle performance as those of the own vehicle, the time series data on the traveling speed (Vel) and the loading amount (PLD) is input from among the items of the data in the past gained via the traveling data gaining device 9. In step S022, the traveling speed (Vel) of the own vehicle and the other vehicles is divided into the loaded state and the empty state based on the loading amount (PLD).

In steps S505 and S510, it is checked first whether or not the traveling speed (Vel) of the own vehicle is not less than a predetermined threshold value, whereby it is determined whether or not the own vehicle is traveling toward the destination. When it is not determined that the own vehicle is traveling, the procedure advances to step S025 or S028, and the same processing as that of FIG. 14 is performed. On the other hand, when it is determined that the own vehicle is traveling, the following processing is performed in steps S505 and S510. First, from the past data including the other vehicles of the same route, rating, and vehicle performance (the data gained via the traveling data gaining device 9), there is calculated the latest traveling time (Time_run) of the current traveling route (See FIG. 8). The calculation of the traveling time (Time_run) is executed in accordance with the procedures described above. This traveling time (Time_run) is treated as the traveling time expected in the current work cycle of the own vehicle (expected traveling time). At the same time, the elapsed time from the latest work completion time of the own vehicle (e.g. points O, B, and D of FIG. 6) is calculated as the actual traveling time (Time_run_now). For example, in the empty cycle of FIG. 6, when the current time is at point B', the actual traveling time (Time_run_now) from point B is B'-B. Next, the actual traveling time (Time_run_now) is subtracted from the expected traveling time (Time_run) to calculate the traveling remaining time (Time_remain=Time_run−Time_run_now), and the ratio of the traveling remaining time (Time_remain) with respect to the expected traveling time (Time_run) (the traveling remaining time ratio: β=Time_remain/Time_run) is calculated. Finally, by using this β and the work waiting time (Tn) calculated in step S024, Tn/β is calculated, whereby the work waiting time is corrected. The work waiting time (Time_delay$_{real}$) calculated by the flow of FIG. 34 is output to the switching determination sections 28 and 21, and is utilized for the output of a selection signal.

Although not described in detail, also regarding the setting of the engine power suppression amount, as in the case of the above calculation of the work waiting time, the time series data on the traveling speed, accelerator opening, and loading amount of the own vehicle and another vehicle (of the same route, rating, and vehicle performance as those of the own vehicle) is input, and calculation is performed as appropriate in accordance with the flowchart of FIG. 5. However, as in embodiment 1, the engine power suppression amount may be set based solely on the data on the own vehicle. This also applies to the engine speed command (Ne*) calculated by the engine speed command calculation section 13.

When the correction of the work waiting time is executed as in the present embodiment, in the case, for example, where, during the traveling of the own vehicle, the data is updated to a longer work waiting time than that which has been the target value, the shorter the traveling remaining time (i.e., the smaller the value of β), the easier it is to execute the power suppression control. Thus, there is more possibility of the engine power suppression amount being quickly increased based on the latest work waiting time. This also applies to the case where the work waiting time is updated to be shorter, and it is possible to quickly reflect the work waiting time of the other vehicles in the mine on the own vehicle.

In the transportation operation in a mine, there are traveling a plurality of dump trucks of the same rating and vehicle performance in the same route. When the route, rating, and vehicle performance are the same, information obtained from other vehicles can be used for the engine output power suppression of the own vehicle. In embodiment 1 the work waiting time cannot be updated unless the own vehicle has traveled one cycle, whereas, in the present embodiment, the updating of the work waiting time is possible even during traveling. Thus, as compared with embodiment 1, it is possible to perform finer engine output power control, so that it is possible to achieve an enhancement in transportation efficiency and fuel consumption reduction effect.

Also in the present embodiment, the number of the threshold values (Tth) of the work waiting time may be increased. In this case, it goes without saying that the possibility of the power suppression control functioning increases. Further, while in the above case, when calculating the traveling time (Time_run_now), the work completion time is estimated to be points O, B, and D based on the threshold value of the loading amount (Mth), the actual traveling time (Time_run_now) may be calculated instead of the points O, B, and D so along as it is a time included in the section after the start time of each operation (loading/earth-disposal) to a point before the completion of the operation. Further, when it is possible to gain the traveling start time Z (See FIG. 6) in each work cycle, the actual traveling time (Time_run_now) may be calculate by using the time as a reference. This also applies to the calculation of the traveling time (Time_run) including the other embodiments.

In embodiments 1 and 2, the work waiting time (Time_delay$_{real}$) of the loading operation is estimated from a change in traveling speed and loading amount as described with reference to FIG. 6. However, in the case where the own vehicle obtains information from the hydraulic excavator (loading work machine) as in the case of the present embodiment, it is possible to calculate the work waiting time (Time_delay$_{real}$) of the loading operation by obtaining the time interval ΔThorn at which the horn of the excavator is honked to inform of the completion of the loading (calling the dump truck to perform the next loading operation). For example, the relationship between the ΔThorn and the work waiting time (Time_delay$_{ave}$) is determined based on the data in the past, whereby it is possible to calculate the work waiting time (Time_delay$_{real}$) by ΔThorn gained in real time. Similarly, also regarding the earth disposal operation, in the case where there is some sign letting the completion of the earth disposal known, it is possible to calculate the work waiting time based on the time interval thereof.

Embodiment 4

While embodiment 3 described above presupposes embodiment 1, the construction of the traveling data gaining device 9 (FIG. 23) and the method of calculating the work waiting time (Time_delay$_{real}$) (FIG. 34) described in connection with embodiment 3 are also applicable to embodiment 2.

By using the present embodiment, the updating of the work waiting time is expedited as compared with embodiment 2, and it is possible to perform finer engine output power control, so that it is possible to enhance the transportation efficiency and the fuel consumption reduction effect.

Embodiment 5

While the embodiments described above are applied to a dump truck equipped with an electric power transmission device 2, the present invention is also applicable to a so-called mechanical type power transmission device 2 formed by a transmission employing gears and a torque converter. In the following embodiment, the present invention is applied to the mechanical type power transmission device 2.

In embodiment 5, the technical idea of embodiment 1 is applied to a dump truck equipped with a mechanical type power transmission device 2. The basic construction of the present embodiment is the same as that of embodiment 1 shown in FIG. 2. The difference from embodiment 1 lies in the inner construction of the power transmission device 2, the ECU 7, and the PCU 8.

First, the power transmission device 2 will be described. In the case of the present embodiment considered, the power transmission device 2 is formed by a transmission employing gears and a torque converter. At the time of power transmission, the transmission performs gearshift ($1^{st}$ speed, $2^{nd}$ speed, etc.) in accordance with the traveling state. This gearshift is conducted by the PCU 8. The PCU 8 performs control by using the engine speed, the accelerator opening, and the wheel speed obtained from as the input from the ECU 7. In this specification, such a construction is sometimes referred to as the mechanical type.

Figure 24:
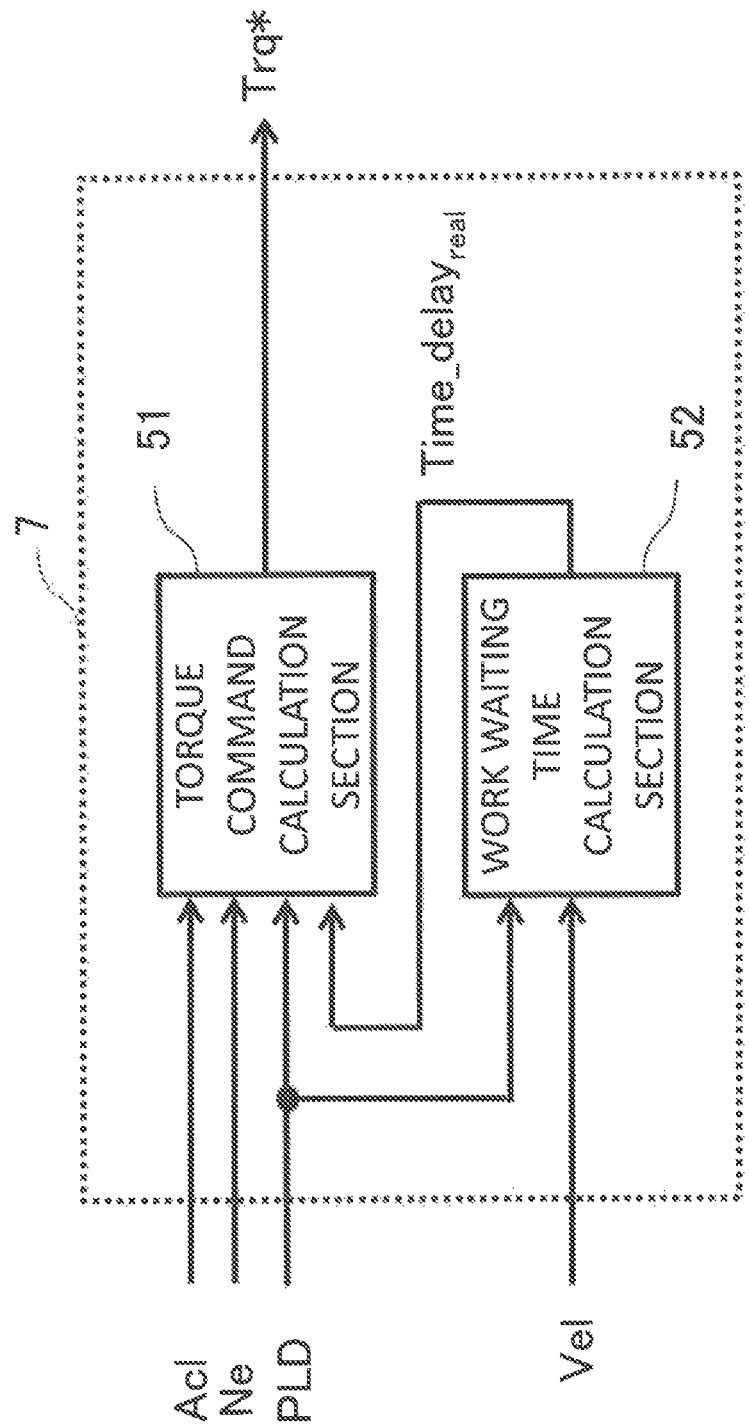
FIG. 24 is a control block diagram illustrating processing by the ECU 7 of embodiments 5 and 7 of the present invention.

Next, the construction of the ECU 7 of the present embodiment will be described with reference to FIG. 24. The function block can be divided into a torque command calculation section 51 and a work waiting time calculation section 52. The work waiting time calculation section 52 is endowed with the same function as that of the work waiting time calculation section 15 described in connection with embodiment 1.

Figure 25:
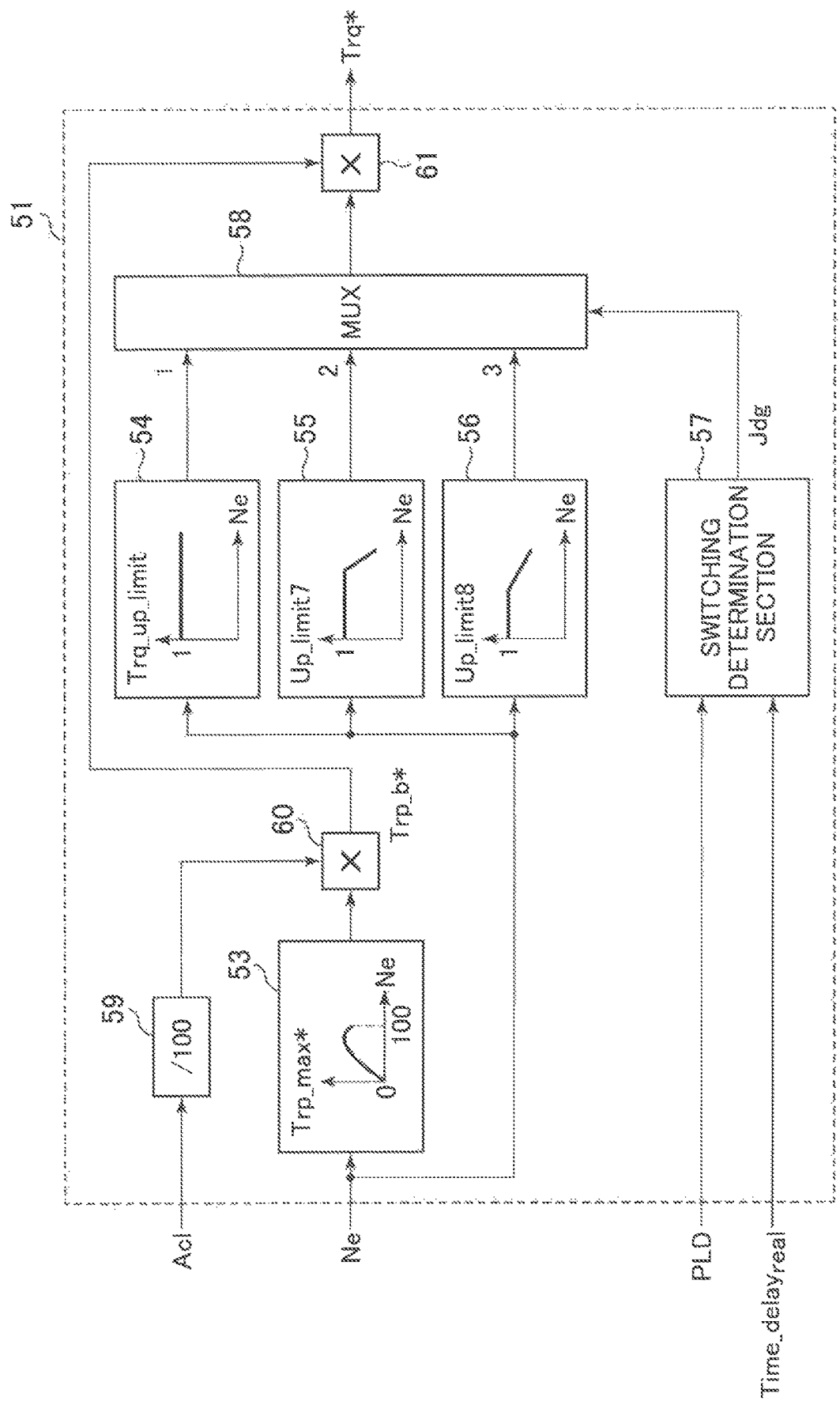
FIG. 25 is a control block diagram illustrating processing by a torque command calculation section 51 of embodiments 5 and 7 of the present invention.

The torque command calculation section 51 inputs the accelerator opening (Acl), the engine speed (Ne), the loading amount (PLD), and the average (during traveling) work waiting time (Time_delay$_{real}$), and outputs a torque command (Trq*). The torque command calculation section 51 will be described in detail with reference to FIG. 25. The input engine speed (Ne) is converted by the map 53 to a torque command (Trq_max*) with respect to the engine speed. The Trq_max* commands the maximum torque than can be used for the driving wheels 3L and 3R. After this, the accelerator opening (Acl) is divided by 100 by a division section 59, and the resultant value is multiplied by Trq_max* by a multiplication section 60, whereby the torque command value (Trq_b*) in the case where no power suppression is performed is calculated. The calculated Trq_b* is input to filters 54, 55, and 56.

The filter 54 is used in the case where no power suppression is effected, the filter 55 is used in the case where power suppression is effected in the loaded state, and the filter 56 is used in the case where power suppression is effected in the case where power suppression is effected in the empty state. The selection of the filter is executed by the MUX 58 based on a selection signal (Jdg) from a switching determination section 57. The switching determination section 57 has the same function as that of the switching determination section 28 described in connection with embodiment 1. As in embodiment 1, a plurality of threshold values may be set in the switching determination section 57. In the case where a plurality of threshold values are set, it is necessary to increase the number of limiters that can be selected by the MUX.

In the filters 54, 55, and 56, the torque suppression amounts Up_limit7 and Up_limit8 vary in accordance with the engine speed. For the calculation of the torque suppression amount, there is utilized the average engine output power upper limit value (Pow_up_limit$_{ave}$) that is calculated in the same manner as in embodiment 1. When the upper limit of the output power is determined, the suppression of the torque in accordance therewith is necessary. The engine output power is calculated as follows: "the engine torque× the engine speed," so that when the output power is fixedly limited by the upper limit value, the torque suppression amount must be varied in accordance with the engine speed. In the present embodiment, the torque suppression amount (Trq_up_limit) must be determined before traveling. Further, also in the case where the traveling route is changed, the previous calculation must be executed again by using data on the new route.

Figure 26:
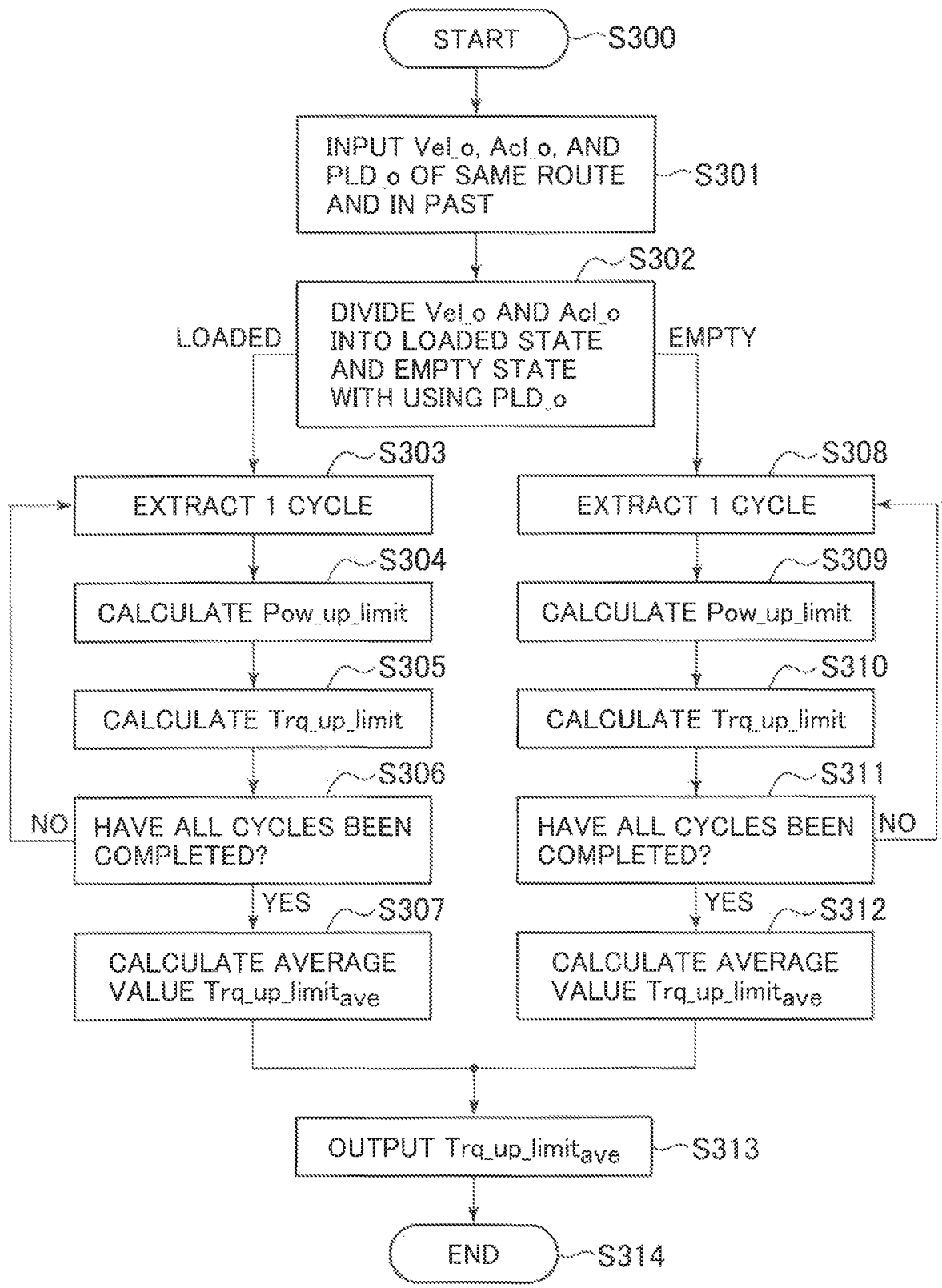
FIG. 26 is a flowchart for illustrating an average torque suppression amount (Trq_up_limit$_{ave}$) before traveling in embodiments 5 and 7 of the present invention.

In the following, the method of determining the power upper limit value and the torque suppression amount will be described with reference to FIG. 26. First, the time series data on the traveling speed (Vel_o), the accelerator opening (Acl_o), and the loading amount (PLD_o) when the own vehicle traveled through the same route in the past is input (S301). Next, the traveling speed data (Vel_o) and the accelerator opening (Acl_o) are divided into the loaded state and the empty state based on the information on the loading amount (PLD) (S302). Hereinafter, the flow in the loaded state will be mainly described. Data corresponding to one cycle is extracted in step S303, and then, in step S304, the engine output power upper limit value (Pow_up_limit) is calculated. The calculation method is the same as than of embodiment 1, so a description thereof will be left out. After this, the torque suppression amount (Trq_up_limit) is calculated in step S305.

Figure 27:
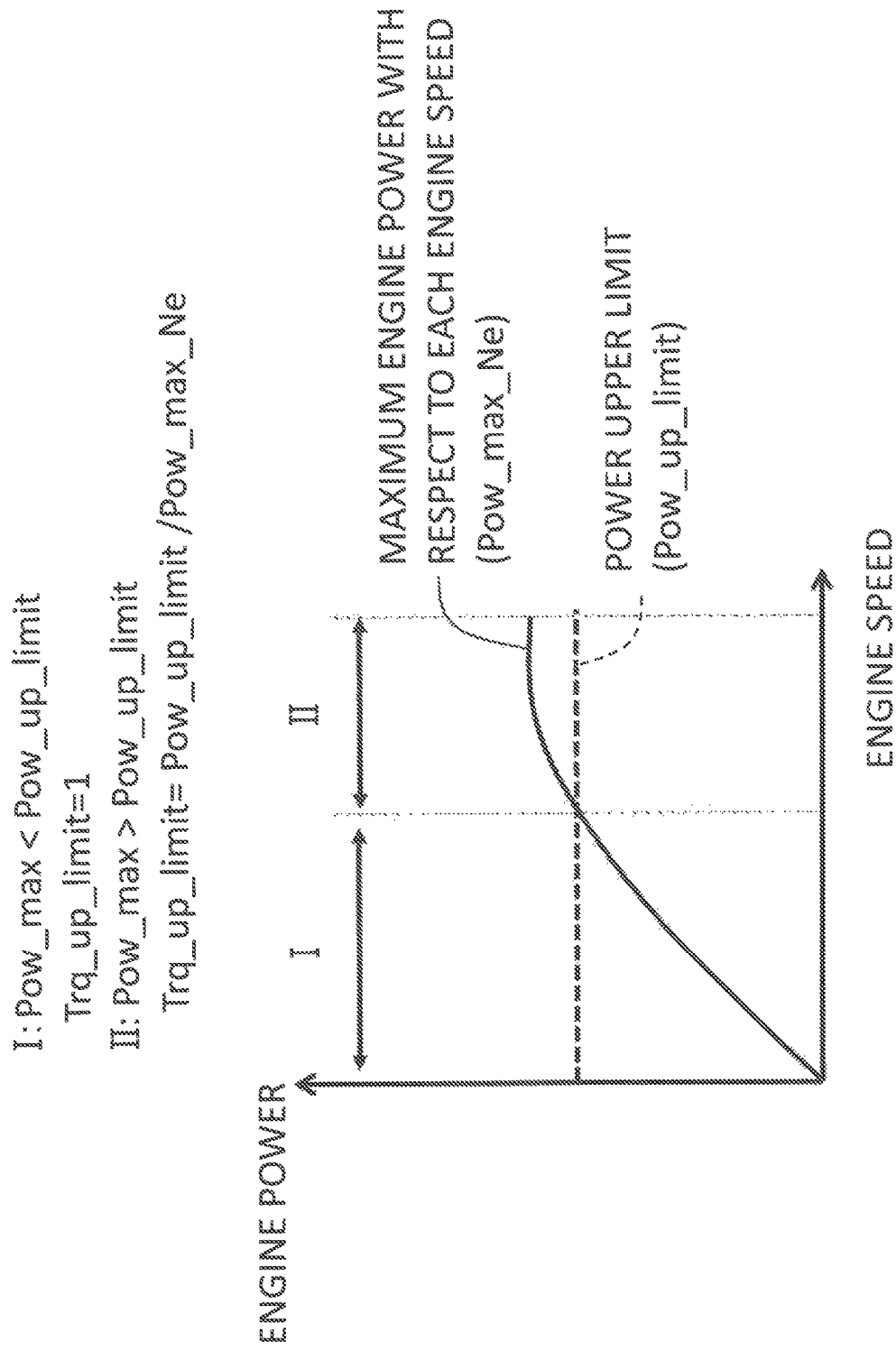
FIG. 27 is a diagram illustrating a method of calculating a torque suppression amount (Trq_up_limit).

The torque suppression amount calculation method in step S305 will be described with reference to FIG. 27. In FIG. 27, the engine maximum output power (Pow_max Ne) determined by the engine speed is indicated by the solid line, whereas the engine output power upper limit value (Pow_up_limit) is indicated by the broken line. There exists a case (I) where Pow_max Ne is smaller than Pow_up_limit, and a case (II) where Pow_max Ne is larger than Pow_up_limit. In the case I, there is no need to suppress the torque, so setting is made as follows: Trq_up_limit=1. On the other hand, in the case II, the value obtained by dividing Pow_up_limit by Pow_max Ne is set as Trq_up_limit. This processing is performed with respect to each engine speed, whereby it is possible to determine the necessary torque suppression amount for achieving the requisite power suppression.

Finally, when the calculation of all the cycles is completed (S306), the average value of the torque suppression amount (Trq_up_limit) with respect to each engine speed is calculated, and $Trq\_up\_limit_{ave}$ is output. The Up_limit7 and Up_limit8 of the filters 55 and 56 are set based on the calculated average torque suppression amount ($Trq\_up\_limit_{ave}$).

By adopting the present embodiment, also in a dump truck having a mechanical type power transmission device 2, it is possible to achieve compatibility between an improvement in terms of transportation efficiency and a reduction in fuel consumption amount as in embodiment 1.

Embodiment 6

In embodiment 6, the technical idea of embodiment 2 is applied to a dump truck equipped with a mechanical type power transmission device 2. Embodiment 6 is of the same basic construction as embodiment 5. The difference lies in the construction of the ECU 7.

Figure 28:
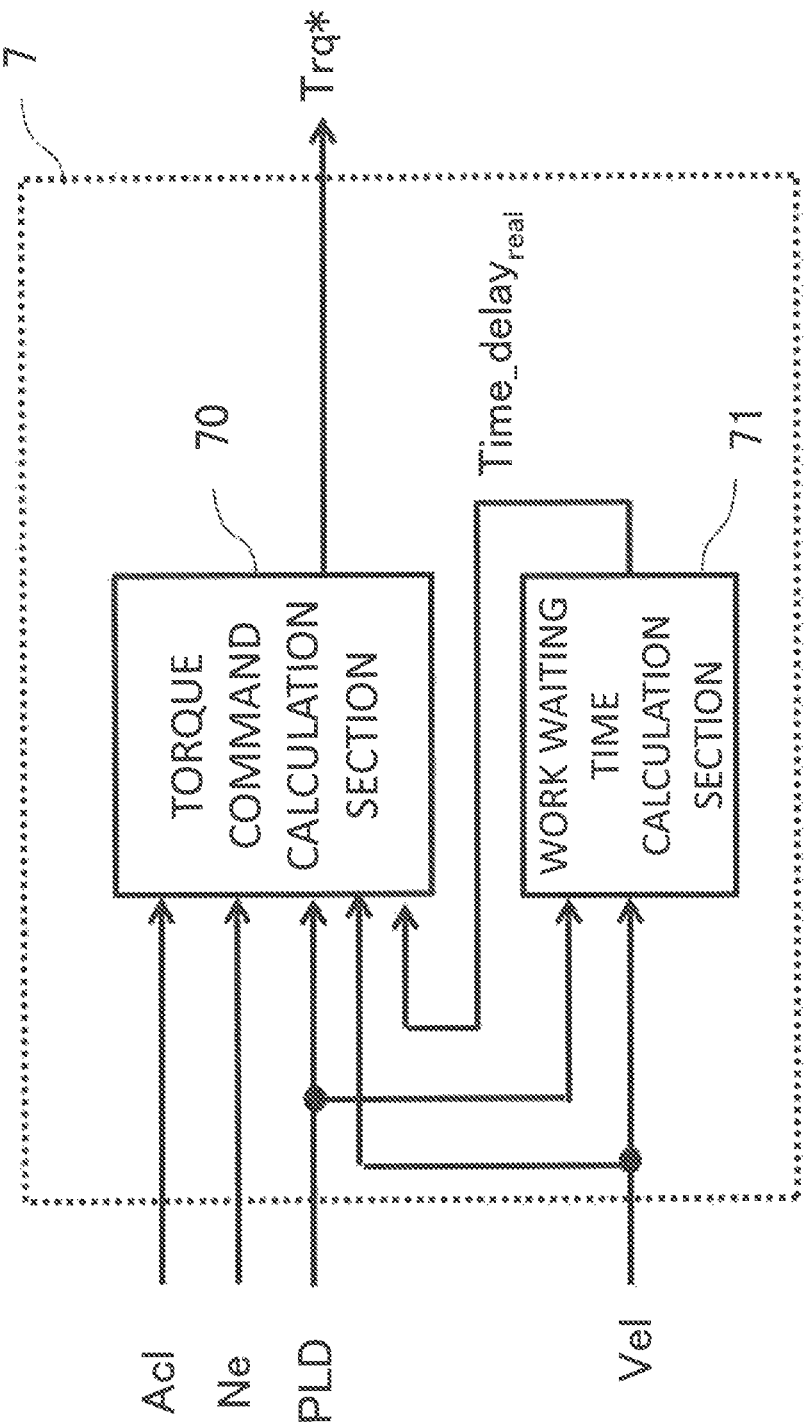
FIG. 28 is a control block diagram illustrating processing by the ECU 7 of embodiments 6 and 8 of the present invention.

FIG. 28 shows the construction of the ECU 7 of the present embodiment. The ECU 7 of the present embodiment can calculate the upper limit value of the limiter, which required previous calculation in embodiment 5, from real time data gained during traveling. As in embodiment 5, the function block of the ECU 7 can be divided into a torque command calculation section 70 and a work waiting time calculation section 71, and the work waiting time calculation section 71 has the same function as that of the work waiting time calculation section 15 described in connection with embodiment 1.

Figure 29:
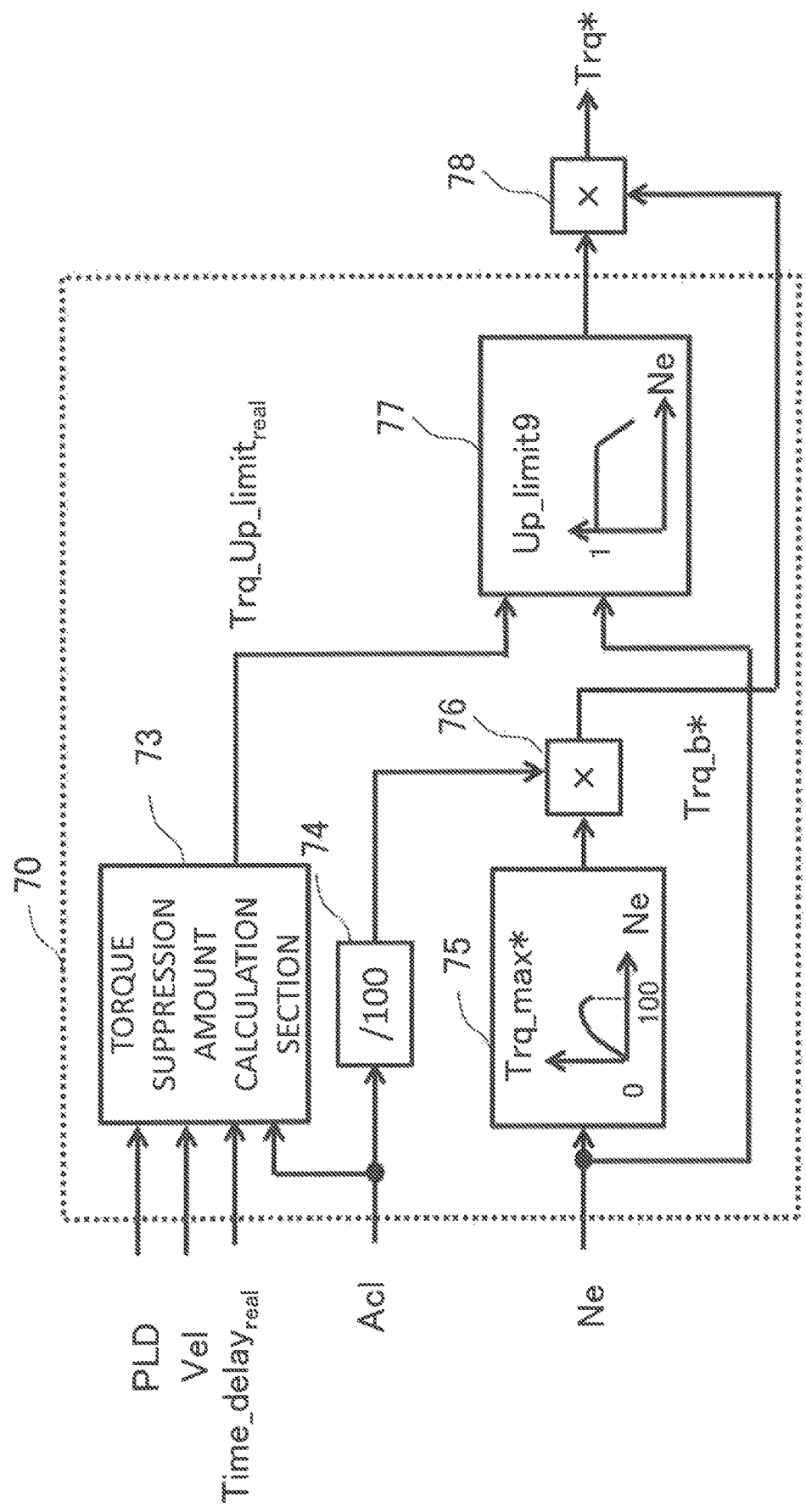
FIG. 29 is a control block diagram illustrating processing by a torque command calculation section 70 of embodiments 6 and 8 of the present invention.

The torque command calculation section 70 outputs the accelerator opening (Acl), the engine speed (Ne), the loading amount (PLD), and the traveling speed (Vel), and outputs the torque command (Trq*). FIG. 29 shows the construction of the torque command calculation section 70. The input engine speed (Ne) is converted by the map 75 to the torque command (Trq_max*) with respect to the engine speed. The Trq_max* commands the maximum torque that can be used for the driving wheels 3L and 3R. After this, the accelerator opening (Acl) is divided by 100 by a division section 74, and the resultant value is multiplied by Trq_max* by a multiplication section 76, whereby the torque command value (Trq_b*) in the case where no power suppression is effected is calculated. The calculated Trq_b* is input to a filter 77.

The filter 77 has the same characteristic as that of the filter described in connection with embodiment 5. The torque suppression amount (Up_limit9) used in the filter 77 is calculated by the torque suppression amount calculation section 73.

Figure 30:
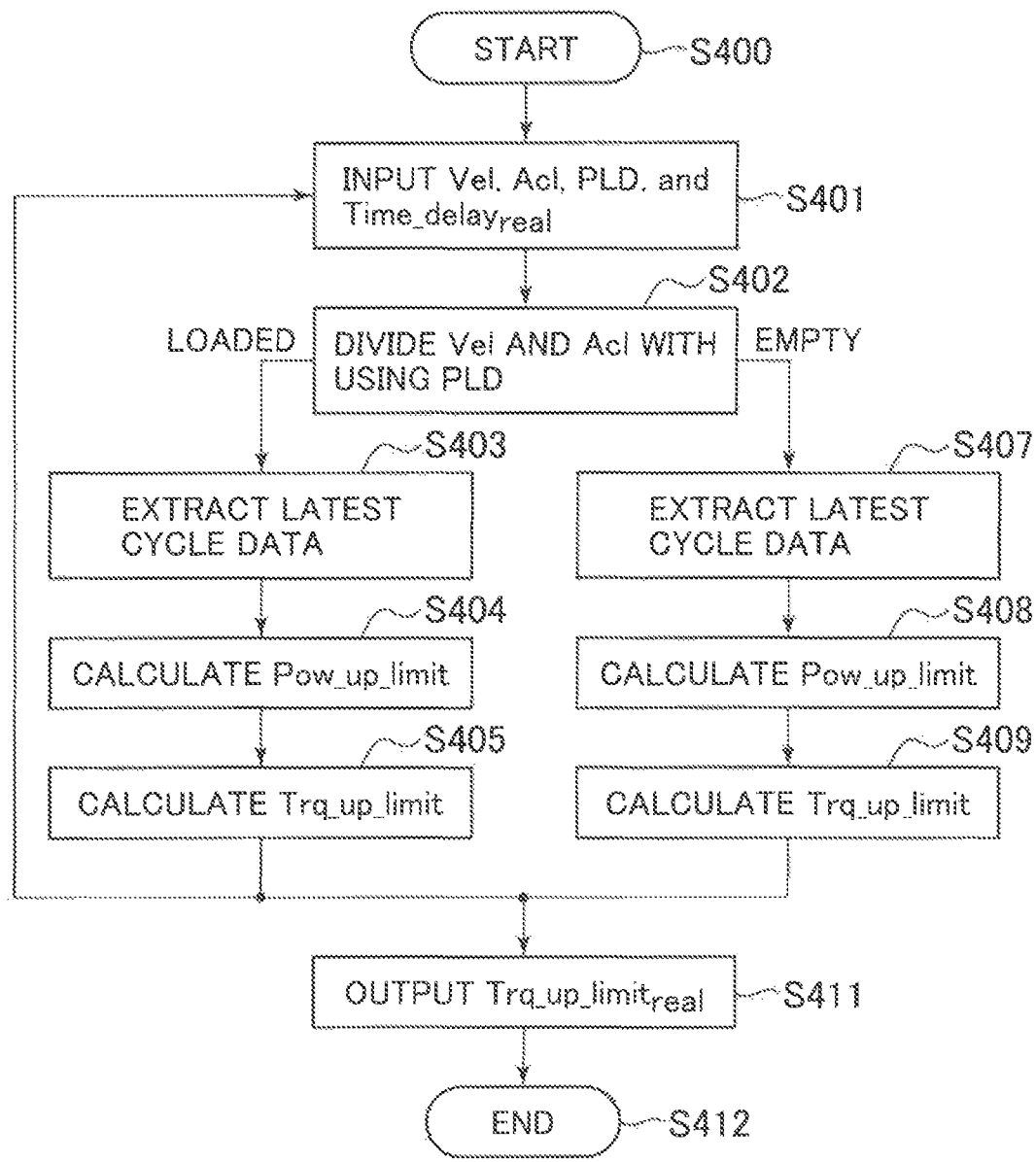
FIG. 30 is a flowchart for calculating a torque suppression amount (Trq_up_limit$_{real}$) during traveling in embodiments 6 and 8 of the present invention.

The torque suppression amount calculation section 73 inputs the loading amount (PLD), the traveling speed (Vel), the average (during traveling) work waiting time ($Time\_delay_{real}$), and the accelerator opening (Acl). The torque suppression amount calculation method is shown in detail in FIG. 30. The traveling speed data (Vel) and the accelerator opening (Acl) are input for each cycle traveling (S401), and the data is divided into the loaded state and the empty state based on the information on the loading amount (PLD)

(S402). Hereinafter, the operational flow in the loaded state will be described. In step S403, the latest cycle data is extracted, and then, in step S404, the output power upper limit value (Pow_up_limit) is calculated. After this, the torque suppression amount (Trq_up_limit) is computed in step S405. The detail on the method of computing the output power upper limit value (Pow_up_limit) and the torque suppression amount (Trq_up_limit) with respect to the 1 cycle data has already been described in connection with embodiments 1 and 5, so a description thereof will be left out. The calculated torque suppression amount ($Trq\_up\_limit_{real}$) is input to the filter 77, and substituted for Up_limit9. In the case where the traveling route is changed, the torque suppression amount ($Trq\_up\_limit_{real}$) is reset, and the torque suppression amount ($Trq\_up\_limit_{real}$) is calculated again using new route data. The $Trq\_up\_limit_{real}$ that is the calculation result is input to the filter 77, and is used as the set value of the torque suppression amount (Up_limit9).

By adopting the present embodiment, even in a dump truck having a mechanical type power transmission device 2, as compared with embodiment 5, there is no need to previously calculate the torque suppression amount and the like, and finer engine output power control is possible also with respect to variation in the work waiting time, so that it is possible to enhance the transportation efficiency and the fuel consumption reduction effect.

Embodiment 7

In embodiment 7, the technical idea of embodiment 3 (FIG. 23) is applied to a dump truck equipped with a mechanical power transmission device 2. The basic construction of embodiment 7 is the same as that shown in FIG. 23. The basic construction of embodiment 7 is the same as that of embodiment 5. The difference lies in the construction of the traveling data gaining device 9 and the work waiting time ($Time\_delay_{real}$) calculation method.

The traveling data gaining device 9 of the present embodiment also gains data from the wireless communication device 80 executing communication between the vehicles and communication with the control tower performing the traveling control of the vehicles. The wireless communication device 80 and the work waiting time ($Time\_delay_{real}$) calculation method have already been described in connection with embodiment 3.

By adopting the present embodiment, as compared with embodiment 5, the work waiting time updating interval is shortened, and finer engine output power control is possible, so that it is possible to enhance the transportation efficiency and the fuel consumption reduction effect.

In embodiment 8, the technical idea of embodiment 4 is applied to a dump truck equipped with a mechanical power transmission device 2. The basic construction of embodiment 8 is the same as that of embodiment 6. The difference lies in the construction of the traveling data gaining device 9 and the work waiting time ($Time\_delay_{real}$) calculation method.

The traveling data gaining device 9 of the present embodiment also gains data from the wireless communication device 80 executing communication between the vehicles and communication with the control tower performing the traveling control of the vehicles. The wireless communication device 80 and the work waiting time ($Time\_delay_{real}$) calculation method have already been described in connection with embodiment 3.

By adopting the present embodiment, as compared with embodiment 6, the work waiting time updating interval is shortened, and finer engine output power control is possible, so that it is possible to enhance the transportation efficiency and the fuel consumption reduction effect.

While in the above example there has mainly described the case where the work waiting time is elongated, the present invention is also applicable to the case where the work waiting time is shortened. Further, the present invention is applicable not only to the case where a dump truck performs manned traveling but also to the case where it performs unmanned traveling.

Further, the above-described embodiments are applicable not only to a dump truck but also a haulage vehicle (such as a large truck) the loading/unloading operation of which involves generation of a work waiting time and to any kind of self-propelled machine. Further, while in the above embodiments the earth loading operation (loading operation) and the earth disposal operation (unloading operation) at the loading place and the earth dumping site are described in a set, the engine power suppression may be conducted based on the work waiting time and the engine load solely in connection with one of the above operations.

While in the above description the loading amount and the gradient have been mentioned as the "index indicating the engine load during traveling," the index may also include the air resistance of the dump truck and the road surface resistance.

The present invention is not restricted to the above-described embodiments but also includes various modifications without departing from the scope of the gist of the invention. For example, the present invention is not restricted to a construction equipped with all the components described in the above embodiments but also includes a construction in which a part of the components is deleted. Further, a part of the construction of a certain embodiment may be added to or replaced by the construction of another embodiment.

Further, the construction of the above controller (e.g., the ECU 7 and the PCU 8) and the function, execution processing, etc. of each construction may be realized partially or totally in the form of hardware (For example, the logic for executing each function maybe designed as an integrated circuit). Further, the construction related to the above controller may consist of a program (software) in which each function of the construction related to the controller is realized through reading/execution by a computation processing device (e.g., CPU). The information related to the program can be stored, for example, in semiconductor memory (flash memory, SSD or the like), a magnetic storage device (a hard disk drive or the like), and a storage medium (a magnetic disk, an optical disk or the like).

Further, in the description of the above embodiments the control line and the information line shown are what are regarded as necessary for the description of the embodiments. However, it does not always mean that all the control lines and information lines related to the product are shown. In reality, almost all the components may be regarded to be connected to each other.

DESCRIPTION OF REFERENCE CHARACTERS

1: Engine
2: Power transmission device
3L, 3R: Driving wheel
7: ECU
8: PCU
9: Traveling data gaining device
10: Display device
13: Engine speed command calculation section
14: Engine output power command calculation section
15: Work waiting time calculation section
24: Map of the accelerator opening and the engine output power
25: Limiter
26: Limiter
27: Limiter
28: Switching determination section
29: MUX
99: Control switching condition map

The invention claimed is:

1. A haulage vehicle for performing a predetermined operation after arriving at a destination, the haulage vehicle comprising:
an engine; and
a controller configured to:
control the engine by outputting an engine speed command,
execute a power suppression control that is a process to make larger an engine power suppression amount on a route leading the haulage vehicle to the destination as a work waiting time, that is a prediction time elapsing from an arrival of the haulage vehicle at the destination to a start of the predetermined operation by the haulage vehicle, is longer and as an engine load of the haulage vehicle is lower,
calculate a first work waiting time of the haulage vehicle by inputting time series data of a first traveling speed of the haulage vehicle gained while the haulage vehicle travels along the route and time series data of a first loading amount of the haulage vehicle gained while the haulage vehicle travels along the route,
when the first work waiting time is smaller than a predetermined first threshold, determine the engine speed command based on a first accelerator opening of the haulage vehicle input during travel of the haulage vehicle without limiting a speed of the engine,
when the first work waiting time is equal to or greater than the predetermined first threshold and when the first loading amount is equal to or greater than a predetermined second threshold, select a first engine speed upper limit value on a loading state as an engine speed upper limit value, and determine the engine speed command based on the first accelerator opening,
when the first work waiting time is equal to or greater than the predetermined first threshold and when the first loading amount is less than the predetermined second threshold, select a second engine speed upper limit value on an empty state as the engine speed upper limit value, and determine the engine speed command based on the first accelerator opening,
calculate a second work waiting time, a traveling time, a traveling distance, an average 1-cycle traveling speed, and a maximum power output frequency for each work cycle of at least one other haulage vehicle having a same vehicle rating and a same vehicle performance as the haulage vehicle, based on the predetermined second threshold and a time series data of a second traveling speed, a second accelerator opening, and a second loading amount gained when the at least one other haulage vehicle travels along the route,
calculate an average traveling speed after execution of the power suppression control based on the second work waiting time, the traveling time, the traveling distance, the average 1-cycle traveling speed, and the maximum power output frequency, calculate an engine output power upper limit on a loading state of the haulage vehicle and an engine output power upper limit on an empty state of the haulage vehicle based on the average traveling speed, and calculate the first engine speed upper limit value by converting the engine output power upper limit on the loading state, and the second engine speed upper limit value by converting the engine output power upper limit on the empty state.

2. The haulage vehicle according to claim 1, wherein the controller is configured to: gain the time series data of the second traveling speed, the second accelerator opening, and the second loading amount while the haulage vehicle travels along the route without previously executing the power suppression control.

* * * * *